US011438289B2

(12) United States Patent
Evans et al.

(10) Patent No.: US 11,438,289 B2
(45) Date of Patent: Sep. 6, 2022

(54) GESTURE-BASED COMMUNITY MODERATION

(71) Applicant: Khoros, LLC, Austin, TX (US)

(72) Inventors: David Evans, Austin, TX (US); Vivekanand Venkatesh Kini, Bangalore (IN); Colin Cooper, Austin, TX (US); Vigneshwaran Dharmalingam, Bangalore (IN); Tanmay Sinha, Bangalore (IN)

(73) Assignee: Khoros, LLC, Austin, TX (US)

( * ) Notice: Subject to any disclaimer, the term of this patent is extended or adjusted under 35 U.S.C. 154(b) by 0 days.

(21) Appl. No.: 17/365,222

(22) Filed: Jul. 1, 2021

(65) Prior Publication Data
US 2022/0166735 A1 May 26, 2022

Related U.S. Application Data

(63) Continuation of application No. 17/026,152, filed on Sep. 18, 2020, now Pat. No. 11,128,589.

(51) Int. Cl.
*H04L 51/00* (2022.01)
*H04L 51/52* (2022.01)
*H04L 51/42* (2022.01)

(52) U.S. Cl.
CPC .............. *H04L 51/12* (2013.01); *H04L 51/14* (2013.01); *H04L 51/22* (2013.01); *H04L 51/32* (2013.01)

(58) Field of Classification Search
CPC ......... H04L 51/12; H04L 51/14; H04L 51/22; H04L 51/32; H04L 12/58; H04L 51/066; H04L 67/06; H04I 51/26
See application file for complete search history.

(56) References Cited

U.S. PATENT DOCUMENTS 5,627,764 A * 5/1997 Schutzman ............ G06Q 10/10
358/402
6,041,311 A 3/2000 Chislenko et al.
(Continued)

FOREIGN PATENT DOCUMENTS

CN      102054033 A    5/2011
CN      103177095 B   12/2015
(Continued)

OTHER PUBLICATIONS

European Patent Office, Extended European Search Report dated Nov. 12, 2021 for European Patent Application No. 19741372.7.
(Continued)

*Primary Examiner* — Sargon N Nano
(74) *Attorney, Agent, or Firm* — Kokka & Backus, PC

(57) ABSTRACT

Various techniques for gesture-based community moderation are described, including activating a moderator application at a computing platform hosting a syndication of electronic messages, receiving a signal causing presentation of an electronic message at an interface, detecting an input associated with a position of each of the electronic messages on the interface and activating an automatic action by the moderator application, determining if a non-compliant message component is included in the each of the electronic messages, modifying each of the electronic messages if the non-compliant message component is detected, invoking a predicted automatic action based on the modified electronic message, and displaying the modified electronic message in a different position of the interface.

20 Claims, 12 Drawing Sheets

(56) References Cited

U.S. PATENT DOCUMENTS

| | | | |
|---|---|---|---|
| 6,146,026 A | 11/2000 | Ushiku | |
| 6,385,611 B1 | 5/2002 | Cardona | |
| 6,684,239 B1 | 1/2004 | Flepp et al. | |
| 6,742,032 B1 | 5/2004 | Castellani et al. | |
| 6,871,232 B2 | 3/2005 | Curie et al. | |
| 7,031,952 B1 | 4/2006 | Heumann et al. | |
| 7,032,030 B1 | 4/2006 | Codignotto | |
| 7,130,885 B2 * | 10/2006 | Chandra | G06Q 10/107 709/224 |
| 7,222,156 B2 | 5/2007 | Gupta et al. | |
| 7,260,610 B2 * | 8/2007 | Grooters | G06F 9/546 709/224 |
| 7,409,710 B1 | 8/2008 | Uchil et al. | |
| 7,519,672 B2 * | 4/2009 | Boss | H04L 51/04 705/52 |
| 7,590,636 B1 | 9/2009 | Heumann et al. | |
| 7,606,865 B2 | 10/2009 | Kumar et al. | |
| 7,644,057 B2 | 1/2010 | Nelken et al. | |
| 7,702,541 B2 | 4/2010 | Black et al. | |
| 7,725,492 B2 | 5/2010 | Sittig et al. | |
| 7,751,620 B1 | 7/2010 | Cosoi | |
| 7,756,926 B2 | 7/2010 | Tseng et al. | |
| 7,792,948 B2 | 9/2010 | Zhao et al. | |
| 7,818,758 B2 | 10/2010 | Bonet et al. | |
| 7,831,912 B2 * | 11/2010 | King | G06F 16/9554 715/708 |
| 7,853,565 B1 | 12/2010 | Liskov | |
| 7,979,369 B2 | 7/2011 | Grenier et al. | |
| 8,006,187 B1 | 8/2011 | Bailey et al. | |
| 8,027,931 B2 | 9/2011 | Kalaboukis | |
| 8,082,308 B1 | 12/2011 | Filev | |
| 8,131,745 B1 | 3/2012 | Hoffman et al. | |
| 8,171,128 B2 | 5/2012 | Zuckerberg et al. | |
| 8,200,527 B1 | 6/2012 | Thompson et al. | |
| 8,225,376 B2 | 7/2012 | Zuckerberg et al. | |
| 8,286,154 B2 | 10/2012 | Kaakani et al. | |
| 8,321,300 B1 | 11/2012 | Bockius et al. | |
| 8,412,657 B2 | 4/2013 | Grenier et al. | |
| 8,437,369 B2 | 5/2013 | Shaikh | |
| 8,505,069 B1 | 8/2013 | Solodovnikov et al. | |
| 8,606,792 B1 | 12/2013 | Jackson et al. | |
| 8,615,442 B1 | 12/2013 | Kapur et al. | |
| 8,738,715 B2 * | 5/2014 | Roy | H04L 51/16 709/206 |
| 8,744,937 B2 | 6/2014 | Seubert et al. | |
| 8,752,041 B2 | 6/2014 | Akiyoshi et al. | |
| 8,767,020 B1 * | 7/2014 | Monikandan | G06T 11/60 345/440.1 |
| 8,769,417 B1 | 7/2014 | Robinson et al. | |
| 8,813,125 B2 * | 8/2014 | Reisman | H04N 21/440263 725/110 |
| 8,825,515 B1 | 9/2014 | Hanson | |
| 8,886,580 B2 | 11/2014 | Grenier et al. | |
| 8,892,524 B1 | 11/2014 | Lee et al. | |
| 8,943,069 B2 | 1/2015 | Heumann et al. | |
| 8,972,428 B2 | 3/2015 | Dicker et al. | |
| 9,021,361 B1 | 4/2015 | Pettinati et al. | |
| 9,105,044 B2 | 8/2015 | Wu | |
| 9,131,382 B1 | 9/2015 | Johns | |
| 9,141,997 B2 | 9/2015 | Gaedcke et al. | |
| 9,143,478 B2 | 9/2015 | Ramaswamy | |
| 9,191,235 B2 * | 11/2015 | Clagg | H04L 51/12 |
| 9,229,702 B1 | 1/2016 | Kapulkin et al. | |
| 9,251,360 B2 * | 2/2016 | Meyer | H04L 63/08 |
| 9,282,098 B1 | 3/2016 | Hitchcock et al. | |
| 9,286,102 B1 | 3/2016 | Harel et al. | |
| 9,311,683 B1 | 4/2016 | Saylor et al. | |
| 9,325,696 B1 | 4/2016 | Balfanz et al. | |
| 9,338,186 B2 | 5/2016 | Wollenstein et al. | |
| 9,369,454 B2 * | 6/2016 | Porzio | H04L 51/046 |
| 9,378,295 B1 | 6/2016 | Marra et al. | |
| 9,483,802 B2 | 11/2016 | Gaedcke et al. | |
| 9,501,746 B2 | 11/2016 | Prakash | |
| 9,509,742 B2 | 11/2016 | Gordon | |
| 9,514,459 B1 | 12/2016 | Doshi et al. | |
| 9,519,723 B2 | 12/2016 | Lorenz et al. | |
| 9,596,206 B2 | 3/2017 | Bueno et al. | |
| 9,619,531 B2 | 4/2017 | Wu | |
| 9,654,450 B2 | 5/2017 | Ford et al. | |
| 9,756,098 B2 | 9/2017 | Kazerani et al. | |
| 9,787,664 B1 | 10/2017 | Subbiah et al. | |
| 9,800,639 B2 | 10/2017 | Gordon | |
| 9,953,063 B2 | 4/2018 | Spasojevic et al. | |
| 10,084,838 B2 | 9/2018 | Gordon et al. | |
| 10,142,386 B2 | 11/2018 | Gordon | |
| 10,178,173 B2 | 1/2019 | Kadowaki et al. | |
| 10,180,971 B2 | 1/2019 | Bhave et al. | |
| 10,188,905 B2 | 1/2019 | Dohlen | |
| 10,204,344 B2 | 2/2019 | Gaedcke et al. | |
| 10,204,383 B2 | 2/2019 | Gaedcke et al. | |
| 10,264,042 B2 | 4/2019 | Gordon | |
| 10,264,073 B2 | 4/2019 | Kadowaki et al. | |
| 10,284,723 B1 | 5/2019 | Neuer, III et al. | |
| 10,346,449 B2 | 7/2019 | Senftleber et al. | |
| 10,417,180 B1 | 9/2019 | Patwardhan | |
| 10,430,894 B2 | 10/2019 | Wu | |
| 10,489,866 B2 | 11/2019 | Gaedcke et al. | |
| 10,491,490 B2 | 11/2019 | Sridhar et al. | |
| 10,497,069 B2 | 12/2019 | Gaedcke et al. | |
| 10,594,773 B2 | 3/2020 | Falcao et al. | |
| 10,601,937 B2 | 3/2020 | Holzband et al. | |
| 10,613,745 B2 * | 4/2020 | Mohseni | G06F 3/0485 |
| 10,785,222 B2 | 9/2020 | Senftleber et al. | |
| 10,855,657 B2 | 12/2020 | Senftleber et al. | |
| 10,867,131 B2 | 12/2020 | Scott et al. | |
| 10,902,462 B2 | 1/2021 | Savage et al. | |
| 10,931,540 B2 * | 2/2021 | Davis | H04L 43/0876 |
| 10,956,459 B2 | 3/2021 | Senftleber et al. | |
| 10,999,278 B2 | 5/2021 | Senftleber et al. | |
| 11,050,704 B2 | 6/2021 | Senftleber et al. | |
| 11,061,900 B2 | 7/2021 | Falcao et al. | |
| 11,087,261 B1 | 8/2021 | Basu et al. | |
| 11,153,726 B2 * | 10/2021 | Cheung | H04W 4/08 |
| 2001/0025253 A1 | 9/2001 | Heintz et al. | |
| 2001/0037469 A1 | 11/2001 | Gupta et al. | |
| 2001/0042087 A1 | 11/2001 | Kephart et al. | |
| 2001/0047290 A1 | 11/2001 | Petras et al. | |
| 2002/0010746 A1 | 1/2002 | Jilk et al. | |
| 2002/0049793 A1 | 4/2002 | Okumura et al. | |
| 2002/0070953 A1 | 6/2002 | Barg et al. | |
| 2002/0105545 A1 | 8/2002 | Carter et al. | |
| 2002/0144156 A1 | 10/2002 | Copeland | |
| 2003/0005103 A1 | 1/2003 | Narad et al. | |
| 2003/0028525 A1 | 2/2003 | Santos et al. | |
| 2003/0078959 A1 | 4/2003 | Yeung et al. | |
| 2003/0128203 A1 | 7/2003 | Marshall et al. | |
| 2003/0135565 A1 | 7/2003 | Estrada | |
| 2003/0187871 A1 | 10/2003 | Amano et al. | |
| 2003/0225850 A1 | 12/2003 | Teague | |
| 2004/0049673 A1 | 3/2004 | Song et al. | |
| 2004/0073666 A1 | 4/2004 | Foster et al. | |
| 2004/0133697 A1 | 7/2004 | Mamaghani et al. | |
| 2004/0174397 A1 | 9/2004 | Cereghini et al. | |
| 2004/0199595 A1 * | 10/2004 | Banister | H04L 51/12 709/207 |
| 2005/0060643 A1 | 3/2005 | Glass et al. | |
| 2005/0074126 A1 | 4/2005 | Stanko | |
| 2005/0132348 A1 | 6/2005 | Meulemans et al. | |
| 2005/0206644 A1 | 9/2005 | Kincaid | |
| 2005/0283614 A1 | 12/2005 | Hardt | |
| 2006/0010215 A1 | 1/2006 | Clegg et al. | |
| 2006/0036685 A1 | 2/2006 | Canning et al. | |
| 2006/0129602 A1 | 6/2006 | Witriol et al. | |
| 2006/0143307 A1 | 6/2006 | Codignotto | |
| 2006/0155581 A1 | 7/2006 | Eisenberger et al. | |
| 2006/0185021 A1 | 8/2006 | Dujari et al. | |
| 2006/0206578 A1 | 9/2006 | Heidloff et al. | |
| 2006/0294196 A1 | 12/2006 | Feirouz et al. | |
| 2007/0083536 A1 | 4/2007 | Darnell et al. | |
| 2007/0118889 A1 | 5/2007 | Fredell | |
| 2007/0136354 A1 | 6/2007 | Chen | |
| 2007/0171716 A1 | 7/2007 | Wright et al. | |
| 2007/0220029 A1 | 9/2007 | Jones et al. | |

(56) References Cited

U.S. PATENT DOCUMENTS

| | | |
|---|---|---|
| 2007/0226177 A1 | 9/2007 | Barsness et al. |
| 2007/0240119 A1 | 10/2007 | Ducheneaut et al. |
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |
| 2008/0215591 A1 | 9/2008 | Howard et al. |
| 2008/0221870 A1 | 9/2008 | Attard et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0211911 A1* | 8/2010 | Logan .............. H04M 3/565 370/260 |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0257117 A1 | 10/2010 | Shvadron et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0196931 A1* | 8/2011 | Clagg .............. H04L 51/12 709/206 |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0310942 A1* | 12/2012 | Haynes .............. G06Q 10/02 707/E17.089 |
| 2012/0317198 A1 | 12/2012 | Patton et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0235069 A1 | 9/2013 | Ubillos et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346872 A1 | 12/2013 | Scott et al. |
| 2014/0006524 A1 | 1/2014 | Singh et al. |
| 2014/0032306 A1 | 1/2014 | Sukomyk et al. |
| 2014/0040275 A1 | 2/2014 | Dang et al. |
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0075004 A1 | 3/2014 | Dusen et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |

(56) References Cited

U.S. PATENT DOCUMENTS

| | | |
|---|---|---|
| 2014/0181194 A1 | 6/2014 | Sullivan |
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0245326 A1* | 8/2014 | Kruglick ............. G06F 9/546 719/314 |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0095307 A1 | 4/2015 | Bensberg et al. |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0142748 A1 | 5/2015 | Gottemukkula et al. |
| 2015/0161211 A1 | 6/2015 | Patel et al. |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0193546 A1 | 7/2017 | Bennett et al. |
| 2017/0255536 A1 | 9/2017 | Weissinger et al. |
| 2017/0264619 A1 | 9/2017 | Narayanaswamy et al. |
| 2017/0300490 A1 | 10/2017 | Kachemir et al. |
| 2017/0344748 A1* | 11/2017 | Ghani ..................... H04L 67/22 |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0267951 A1 | 9/2018 | Moah et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0329565 A1 | 11/2018 | Yeung et al. |
| 2018/0332079 A1 | 11/2018 | Ashley et al. |
| 2018/0337871 A1 | 11/2018 | Matta et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2018/0374374 A1 | 12/2018 | Watson et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0228093 A1 | 7/2019 | Falcao et al. |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |
| 2020/0007530 A1 | 1/2020 | Abdul et al. |
| 2020/0051120 A1 | 2/2020 | Senftleber et al. |
| 2020/0053094 A1 | 2/2020 | Kaube et al. |
| 2020/0099676 A1 | 3/2020 | Desarda et al. |
| 2020/0104478 A1 | 4/2020 | Chauhan |
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0151829 A1 | 5/2020 | Wu |
| 2020/0184575 A1 | 6/2020 | Gaedcke et al. |
| 2020/0258091 A1 | 8/2020 | Gaedcke et al. |
| 2020/0287957 A1 | 9/2020 | Falcao et al. |
| 2020/0329110 A1 | 10/2020 | Holzband et al. |
| 2020/0358755 A1 | 11/2020 | Abdul et al. |
| 2020/0366564 A1 | 11/2020 | Davis et al. |
| 2021/0119967 A1 | 4/2021 | Senftleber et al. |
| 2021/0174391 A1 | 6/2021 | Savage et al. |
| 2021/0176136 A1 | 6/2021 | Davis et al. |
| 2021/0226952 A1 | 7/2021 | Senftleber et al. |
| 2021/0250341 A1 | 8/2021 | Senftleber et al. |
| 2021/0256041 A1 | 8/2021 | Senftleber et al. |
| 2021/0328961 A1 | 10/2021 | Senftleber et al. |
| 2021/0357408 A1 | 11/2021 | Falcao et al. |

FOREIGN PATENT DOCUMENTS

| | | |
|---|---|---|
| EP | 2857993 B1 | 8/2017 |
| WO | 2009047674 A2 | 4/2009 |

(56) References Cited

FOREIGN PATENT DOCUMENTS

| WO | 2013158839 A1 | 10/2013 |
|---|---|---|
| WO | 2014089460 A2 | 6/2014 |
| WO | 2014153463 A3 | 1/2015 |
| WO | 2015013436 A2 | 1/2015 |
| WO | 2019075284 A2 | 4/2019 |
| WO | 2019144159 A1 | 7/2019 |
| WO | 2020232311 A1 | 11/2020 |

OTHER PUBLICATIONS

Fiorillo, James N., Final Office Action dated Sep. 27, 2021 for U.S. Appl. No. 16/827,625.
Fiorillo, James N., Notice of Allowance and Fee(s) Due dated Nov. 24, 2021 for U.S. Appl. No. 16/827,625.
Kim, Harry, Notification of Transmittal of the International Search Report and the Written Opinion of the International Searching Authority, or the Declaration, dated Jan. 11, 2022 for International Application No. PCT/US2021/050979.
Leimeister et al., "Success factors of virtual communities from the perspective of members and operators: An empirical study," Proceedings of the 37th Hawaii International Conference on Systems Sciences 2004, IEEE, pp. 1-10 (Year: 2004).
Ofori-Awuah, Maame, Non-Final Office Action dated Sep. 28, 2021 for U.S. Appl. No. 14/929,209.
Rashid, Ishrat, Non-Final Office Action dated Dec. 22, 2021 for U.S. Appl. No. 15/782,653.
Shaw, Robert A., Non-Final Office Action dated Dec. 27, 2021 for U.S. Appl. No. 16/158,169.
"Craigslist Online Community." Craigslist.org. Jul. 6, 2010.
Ahmed, Saba, Final Office Action dated Jun. 29, 2016 for U.S. Appl. No. 14/098,492.
Ahmed, Saba, Non-Final Office Action dated Nov. 19, 2015 for U.S. Appl. No. 14/098,492.
Anicas, Mitchell; An Introduction to OAuth 2, DigitalOcean, Published Jul. 21, 2014, Retrieved Jan. 29, 2021.
Antoniades et al., "we.b: The web of short URLs," Apr. 2011, Proceedings of the 20th International Conference on World Wide Web, Mar. 28-Apr. 1, 2011, Hyderabad, India, pp. 715-724 (Year: 2011).
Arentz et al., Classifying offensive sites based on image content [online], Computer Vision and Image Understanding 94, 295-310, 2004, Retrieved from the Internet: https://www.sciencedirect.com/science/article/abs/pii/S1077314203001875.
Bista, Sanat Kumar et al., "Using Gamification in an Online Community," CSIRO ITC Centre, Conference Paper, 2012.
Blaufeld, Justin R., Final Office Action dated Mar. 24, 2016 for U.S. Appl. No. 14/098,501.
Blaufeld, Justin R., Non-Final Office Action dated Sep. 24, 2015 for U.S. Appl. No. 14/098,501.
Bostock, Mike, Sankey Diagram, available at http://bost.ocks.org/mike/sankey, published May 21, 2012, 1 pg.
Brown Jr., Nathan H., Final Office Action dated Mar. 29, 2011 for U.S. Appl. No. 11/971,856.
Brown Jr., Nathan H., Non-Final Office Action dated Jun. 6, 2012 for U.S. Appl. No. 13/167,482.
Brown Jr., Nathan H., Non-Final Office Action dated Mar. 24, 2014 for U.S. Appl. No. 13/780,487.
Brown Jr., Nathan H., Non-Final Office Action dated Nov. 26, 2010 for U.S. Appl. No. 11/971,856.
Bui, Hanh Thi Minh, Non-Final Office Action dated Mar. 13, 2015 for U.S. Appl. No. 14/012,978.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].
Chung, Mong-Shune, Non-Final Office Action dated Jan. 29, 2016 for U.S. Appl. No. 14/098,505.
Constine, Josh, "Facebook tests notification unsubscribe button for feed posts," Aug. 9, 2010. http://www.adweek.com/socialtime/unsubscribe-button-posts/244868.
Dagnew, Saba, Final Office Action dated Feb. 12, 2020 for U.S. Appl. No. 15/581,795.
Dagnew, Saba, Non-Final Office Action for U.S. Appl. No. 15/581,795 dated Sep. 16, 2019.
Dinh, Khanh Q., Non-Final Office Action dated Mar. 17, 2021 for U.S. Appl. No. 16/820,697.
Dinh, Khanh Q., Notice of Allowance and Fee(s) Due dated Apr. 16, 2021 for U.S. Appl. No. 16/820,697.
Dinh, Khanh Q., Notice of Allowance and Fee(s) Due dated Oct. 29, 2019 for U.S. Appl. No. 15/877,379.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed Jan. 22, 2018 and entitled, "Temporal Optimization of Data Operations Using Distributed Search and Server Management."
Falcao et al., U.S. Appl. No. 15/877,381, filed Jan. 22, 2018 and entitled, "Temporal Optimization of Data Operations Using Distributed Search and Server Management."
Fett et al., The Web SSO Standard OpenID Connect: In-Depth Formal Security Analysis and Security Guidelines, 2017 IEEE 30th Computer Security Foundations Symposium (Year: 2017).
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Fiorillo, James N., Non-Final Office Action for U.S. Appl. No. 15/821,543 dated Aug. 16, 2019.
Fiorillo, James N., Non-Final Office Action dated Jun. 7, 2021 for U.S. Appl. No. 16/827,625.
Fiorillo, James N., Notice of Allowance and Fee(s) Due dated Nov. 14, 2019 for U.S. Appl. No. 15/821,543.
Friedman et al., U.S. Appl. No. 61/650,849, filed May 23, 2012 and entitled, "Dynamic Information Streams in a Social Network Platform."
Frunzi, Victoria E., Final Office Action dated May 17, 2021 for U.S. Appl. No. 16/590,218.
Frunzi, Victoria E., Non-Final Office Action dated Dec. 21, 2020 for U.S. Appl. No. 16/590,218.
Frunzi, Victoria E., Non-Final Office Action dated Oct. 16, 2018 for U.S. Appl. No. 15/018,787.
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.
Georgandellis, Andrew C., Non-Final Office Action dated Jul. 11, 2016 for U.S. Appl. No. 14/035,166.
Goldberg, Ivan R., Final Office Action dated Jun. 29, 2021 for U.S. Appl. No. 16/695,098.
Goldberg, Ivan R., Final Office Action dated Jun. 29, 2021 for U.S. Appl. No. 16/701,143.
Goldberg, Ivan R., Non-Final Office Action dated Apr. 13, 2016 for U.S. Appl. No. 13/865,429.

(56) References Cited

OTHER PUBLICATIONS

Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Goldberg, Ivan R., Non-Final Office Action dated Mar. 10, 2021 forU.S. Appl. No. 16/695,098.
Goldberg, Ivan R., Non-Final Office Action dated Mar. 3, 2021 for U.S. Appl. No. 16/701,143.
Hardt, Dick, The OAuth 2.0 Authorization Framework draft-ieft-oauth-v2-31; Internet Engineering Task Force (IEFT) (Year: 2012).
Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Hatcher, Deirdre D., Non-Final Office Action dated Jan. 14, 2016 for U.S. Appl. No. 13/950,258.
Holzband et al., U.S. Appl. No. 15/821,543, filed Nov. 22, 2017 and entitled, "Responsive Action Prediction Based On Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kim, Harry C., Notification of Transmittal of the International Search Report and the Written Opinion of the International Searching Authority, or the Declaration dated Sep. 16, 2020 for International Patent Application No. PCT/US2020/032999.
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Lithium Website, http://www.lithium.com, Dec. 11, 2010, retrieved from Internet Archive, pp. 1-9.
Liu et al., OAuth Based Authentication and Authorization in Open Telco API; International Conference on Computer Science and Electronics Engineering, 2012 (Year: 2012).
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing:10.1109/SocialCom-PASSAT2012.18.
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Meng, Jau Shya, Non-Final Office Action dated Jan. 3, 2020 for U.S. Appl. No. 15/877,381.
Meng, Jau Shya, Non-Final Office Action dated Jun. 16, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
Mesa, Joel, Non-Final Office Action dated Oct. 6, 2020 for U.S. Appl. No. 15/782,635.
Mesa, Joel, Notice of Allowance and Fee(s) Due dated Feb. 24, 2021 for U.S. Appl. No. 15/782,635.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Nano, Sargon N., Notice of Allowance and Fee(s) Due dated May 19, 2021 for U.S. Appl. No. 17/026,152.
Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Neuman, Clifford B., Proxy-Based Authorization and Accounting for Distributed Systems, IEEE 1993 (Year: 1993).
Niruntasukrat et al., Authorization Mechanism for MQTT-based Internet of Things, IEEE ICC 2016 Workshops: W07-Workshop on Convergent Internet of Things (Year: 2016).
Ofori-Awuah, Maame, Final Office Action dated Oct. 2, 2020 for U.S. Appl. No. 14/929,209.
Ofori-Awuah, Maame, Final Office Action dated Sep. 6, 2019 for U.S. Appl. No. 14/929,209.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Rashid, Ishrat, Non-Final Office Action dated Apr. 2, 2021 for U.S. Appl. No. 15/782,653.
Rashid, Ishrat, Non-Final Office Action dated Jun. 11, 2019 for U.S. Appl. No. 15/782,653.
Rashid, Ishrat, Non-Final Office Action dated Jun. 12, 2020 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools To Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multifactorauthentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Shaw, Robert A., Final Office Action dated Mar. 16, 2021 for U.S. Appl. No. 16/158,169.
Shaw, Robert A., Non-Final Office Action dated Jan. 22, 2021 for U.S. Appl. No. 16/158,169.
Singh, Amardeep, IP Australia, Examination Report No. 1 for Australia Patent Application No. 2019209542 dated Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."

(56) References Cited

OTHER PUBLICATIONS

Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm? d=2788584.
Suh, Andrew, Final Office Action Dec. 3, 2020 for U.S. Appl. No. 16/158,172.
Suh, Andrew, Non-Final Office Action dated Jul. 8, 2020 for U.S. Appl. No. 16/158,172.
Tabor, Amare F., Final Office Action Apr. 8, 2015 for U.S. Appl. No. 13/871,076.
Tabor, Amare F., Non-Final Office Action Aug. 15, 2014 for U.S. Appl. No. 13/871,076.
Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Thomas, Shane, Written Opinion of the International Searching Authority and International Search Report dated Aug. 16, 2013 for International Patent Application No. PCT/US2013/037107.
Trapanese, William C., Non-Final Office Action dated May 27, 2020 for U.S. Appl. No. 16/413,577.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
Vo, Huyen X., Non-Final Office Action Mar. 15, 2019 for U.S. Appl. No. 15/782,642.
Vo, Huyen X., Non-Final Office Action Oct. 15, 2020 for U.S. Appl. No. 16/458,183.
Walsh, John B., Non-Final Office Action dated Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods To Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Olshannikov, Alex, Non-Final Office Action dated Oct. 22, 2015 for U.S. Appl. No. 14/098,509.
Perungavoor, Venkatanaray, Notice of Allowance and Fee(s) Due for U.S. Appl. No. 16/158,167, dated May 15, 2020.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Final Office Action for U.S. Appl. No. 15/782,653 dated Sep. 19, 2019.
Rashid, Ishrat, Final Office Action dated Jun. 15, 2021 for U.S. Appl. No. 15/782,653.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Goldberg, Ivan R., Final Office Action dated Jan. 12, 2015 for U.S. Appl. No. 13/835,502.
Goldberg, Ivan R., Final Office Action dated Jan. 13, 2015 for U.S. Appl. No. 13/835,250.
Goldberg, Ivan R., Final Office Action dated Jan. 15, 2015 for U.S. Appl. No. 13/865,429.

\* cited by examiner

GESTURE-BASED COMMUNITY MODERATION

CROSS-REFERENCE TO RELATED APPLICATIONS

This application is a continuation application of copending U.S. patent application Ser. No. 17/026,152, filed Sep. 18, 2020 and titled, "GESTURE-BASED COMMUNITY MODERATION," all of which is herein incorporated by reference in its entirety for all purposes.

FIELD

Various embodiments relate generally to data science and data analysis, computer software and systems, and control systems to provide a platform to facilitate implementation of an interface as a computerized tool, among other things, and, more specifically, to a computing and data platform that implements logic to facilitate moderation of electronic messages, postings, content, etc., via implementation of a moderator application configured to, for example, perform one or more actions automatically.

BACKGROUND

Advances in computing hardware and software have fueled exponential growth in delivery of vast amounts of information due to increased improvements in computational and networking technologies. Also, advances in conventional data network technologies provide an ability to exchange increasing amounts of generated data via various electronic messaging platforms. Thus, improvements in computing hardware, software, network services, and storage have bolstered growth of Internet-based messaging applications, such as social networking platforms and applications, especially in an area of exchanging digital information concerning products and services to facilitate customer care operations, as well as online communities. For example, various organizations and corporations (e.g., retailer sellers) may exchange information through any number of electronic messaging networks, including social media networks. Such entities aim to respond quickly and efficiently to messages from customers (and potential customers) to manage brand loyalty and reputation, and to bolster customer engagement.

And since different customers prefer communicating over different communication channels (e.g., social media networked channels and communities of electronic messages) and various different data networks, traditional customer-relationship management ("CRM") computing systems and processes are not well-suited to adapt to engage and moderate communities of customers and associated computing devices at convenience of the customers "on-the-go."

Social media networks and communities can be found in widespread use as there are many different types and categories often reaching as many as a billion or more users, electronic messages, or units of content, which include various types of content, such as pictures, text, video, audio, multimedia, or any combination thereof. Social media networks and communities are increasingly prolific and can range in scope, size, interest, and reach. Social media networks and communities, in some cases, can be integrated with websites, platforms, or other online properties for specific interests or purposes, which may be social, commercial, governmental, educational, academic, professional, technical, etc.

Various social media networks, websites, and communities can require communities of content to meet certain standards, terms, or conditions that are social, cultural, or legal in nature, which require compliance and, consequently, can often reduce or limit what content may be posted online. Generally, profane or hateful content, threatening content, perjurious commercial speech, and the like, may violate policies and terms of use of a community, which, if unmoderated, can result in social detriment, legal liability, breach of cultural values and mores (e.g., alongside laws, rules, and regulations), or other deleterious effects. In other cases, fraudulent product reviews may damage the online goodwill and perceived value of a company and its products.

To enforce compliance and avoid inappropriate content from being posted into a community of content and electronic messages, traditional social media networks and communities implement conventional social media networks, platforms, platform technologies, and software to monitor, moderate, and manage content and electronic message prior to posting. Conventionally, employees or other personnel (e.g., of various social media networks, platforms, platform providers, and software developers that provide products or services) may be required, as moderators, to read, review, or otherwise scrutinize content intended to be posted to one or more social media networks, or to online communities and groups.

Moderators may be required to review and act on hundreds, thousands, or perhaps hundreds of thousands of items, uploads, or other postings (e.g., electronic posts, messages, units of content, etc.) to ensure compliance with terms (e.g., terms of use), conditions, policies, laws, regulations, rules, and the like. However, conventional moderation techniques and software, including those integrated with existing social media management platforms are generally inefficient, expensive, time-consuming, and usually cumbersome to maintain given the increasing amounts of posting submissions.

Various drawbacks to traditional techniques to moderation using known computing devices and software can often lead to fatigue, resulting in lapses in focus, inadvertent posts, errors, and the like, which may create significant cost and effort to correct. Erroneously moderated content, which may result in propagation of unmoderated content, can also detrimentally affect cohesiveness, trustworthiness, reliability, and reputations of online communities. Further, suboptimal moderation techniques using computing devices and moderator software may increase risk of civil and criminal penalties for unmoderated speech or content that is regulated by law (e.g., violations of Americans with Disabilities Act, or "ADA"). In addition, incorrect or suboptimal content posted into a community may cause customer frustration and dissatisfaction, which can typically be projected negatively unto a corporation and its brand.

Thus, what is needed is a solution for facilitating techniques that optimize computer utilization and performance associated with moderating content and/or electronic messages, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
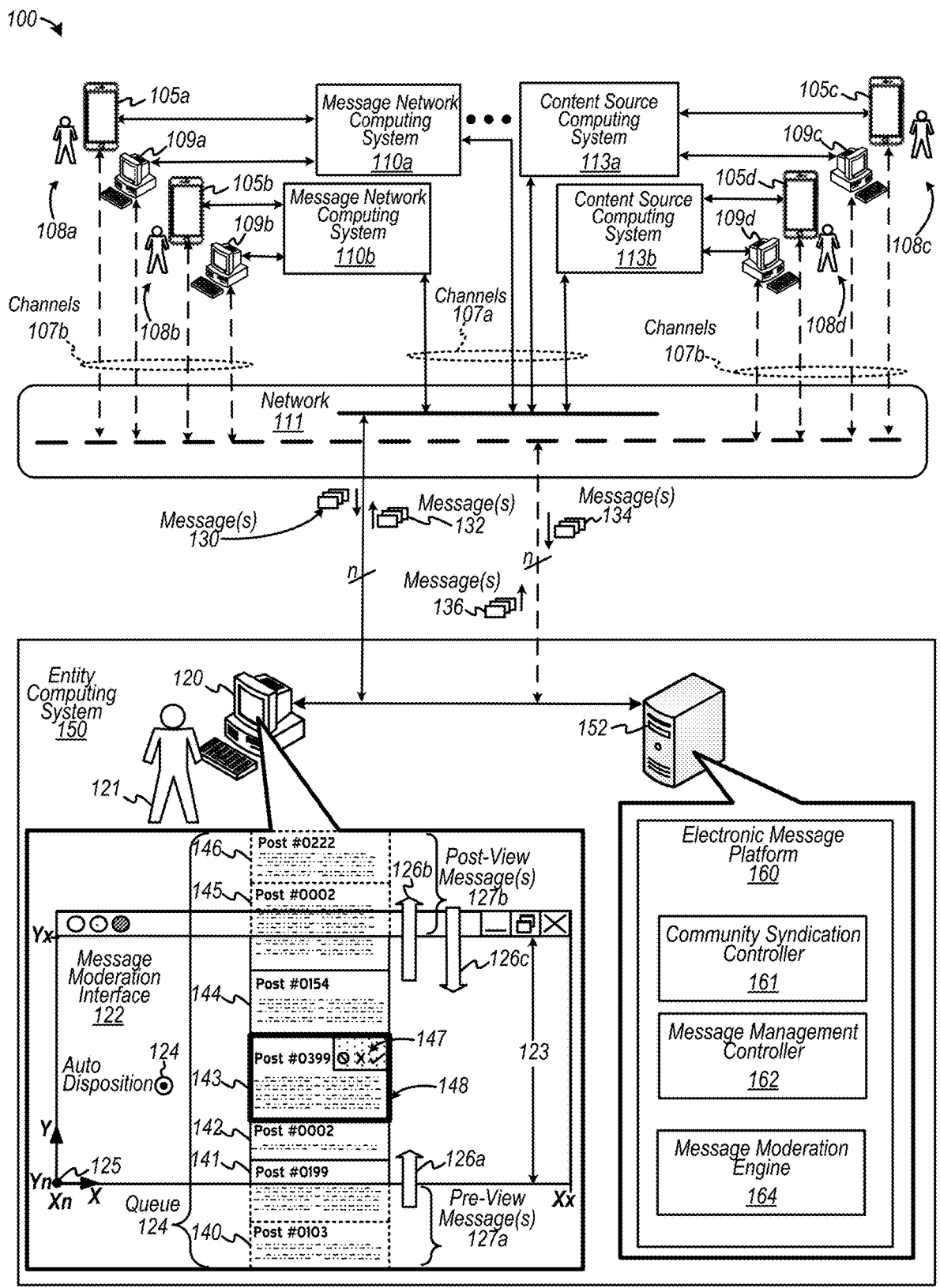
FIG. 1 is a diagram depicting an electronic message platform to facilitate moderation of subsets of electronic content, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Wash., FMP, Oracle®, Salesforce.com, Inc., or others, without limitation or restriction to any particular instance or implementation. DynamoDB™, Amazon Elasticsearch Service, Amazon Kinesis Data Streams ("KDS™"), Amazon Kinesis Data Analytics, and the like, are examples of suitable technologies provide by Amazon Web Services ("AWS").

Further, references to databases, data structures, or any type of data storage facility may include any embodiment as a local, remote, distributed, networked, cloud-based, or combined implementation thereof. For example, social networks and social media (e.g., "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering, content sharing, or like purposes. Data may be generated in various formats such as text, audio, video (including three dimensional, augmented reality ("AR"), and virtual reality ("VR"), or others, without limitation, for use on social networks, social media, and social applications (e.g., "social media") such as Twitter® of San Francisco, Calif., Snapchat® as developed by Snap® of Venice, Calif., Messenger as developed by Facebook®, WhatsApp®, or Instagram® of Menlo Park, Calif., Pinterest® of San Francisco, Calif., LinkedIn® of Mountain View, Calif., as well as community-based networks, such as Khoros® Community as provided by Khoros, LLC of Austin, Tex., and others, without limitation or restriction.

In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others.

In some examples, systems, software, platforms, and computing clouds, or any combination thereof, may be implemented to facilitate online "communities" of subsets of units of content, postings, electronic messages, and the like. In some cases, units of content, electronic postings, electronic messages, and the like may originate at social networks, social media, and social applications, or any other source of content.

FIG. 1 is a diagram depicting an electronic message platform to facilitate moderation of subsets of electronic content, according to some embodiments. Diagram 100 depicts an example of an entity computing system 150 including an electronic message platform 160 that may be configured to, among other things, facilitate moderation of electronic messages, postings, content, etc., via implementation of a moderator application and/or computing device configured to, for example, perform one or more actions automatically. In various examples, one or more inbound electronic messages may be disposed (e.g., as unmoderated electronic messages) in a queue so that electronic message platform 160 may facilitate moderation or filtering of the inbound electronic messages for posting into an online community, such as messages 130 and 134. In some examples, moderation of electronic messages may be based on a user input that may be configured to perform multiple actions regarding each electronic message in a queue. In some examples, a user input to perform multiple actions may be implemented using a common user input, which may include a common gesture. Hence, a gesture, as a user input into a gesture-based interface, may facilitate moderation of electronic messages, at least in some examples. According to various examples, an electronic message may refer to an electronic post, content (e.g., or portion thereof, such as a unit of content), and the like, any of which may originate in various different formats and may be adapted for integration into an online community of, for example, categorized or classified content as presented in one or more webpages or any other electronic media. An electronic message or post may also refer to, for example, data representing an article, a comment, a reply submitted to an online community, or the like.

Diagram 100 depicts an entity computing system 150 including a user interface 120 and a computing device 152 (e.g., one or more servers, including one or more processors and/or memory devices), both of which may be configured to moderate electronic messages and implement any number of actions to facilitate the moderation of such messages based on logic disposed in electronic message platform 160. As shown, computing device 152 may be configured, in at least one example, to provide one or more software functionalities and/or hardware structures to implement a community syndication controller 161, a message management controller 162, and a message moderation engine 164.

Community syndication controller 161 may be configured to host an online community to facilitate an electronic exchange of information and data among a group of users with related interests, goals, questions, problems, suggestions, experiences, etc., regarding one or more products, one or more services, or any other one or more topics or subject matter-related issues, or the like. Further, community syndication controller 161 may be configured to interact electronically with message moderation engine 164, which may be configured to moderate or filter (e.g., for approval) exchanges or postings of electronic messages in a moderated online community regardless of data formats (e.g., as a blog, a website, an email, a text message, or the like). Message management controller 162 may include logic configured to manage electronic interactions and messages among an online community as well as any other sources of data (e.g., online chat sessions, electronic messages directed to an entity rather than a community, or the like). In at least one example, community syndication controller 161 may be implemented with at least some functionality provided by an application configured to operate in accordance with Lithium Community technologies (formally of Lithium Technologies, LLC), Khoros® Communities of Khoros, LLC of Austin Tex., and "Atlas" Communities of Khoros, LLC of Austin Tex., among other online community configurations. Further, message management controller 162 may be implemented using at least some functionality provided by an application configured to operate in accordance with "Modern Chat"-related technologies and "Khoros Care"-related technologies, both of Khoros, LLC of Austin Tex., among other technologies.

In some examples, a subset of an electronic community (e.g., online community) may include any number of electronic messages or posts that may relate to each other by subject matter or any other classification. As an example, an online community may be subdivided based on whether content relates to a "forum" (e.g., content directed to resolving a problem), an "idea" (e.g., content directed to proposed suggestions related to any item, such as a product), a "frequently-asked question" (e.g., content directed to searchable solutions that are determined to be effective), an "expert" classification (e.g., directed to users or electronic accounts associated with expert-based content), a "knowledge base" of searchable solutions to user inquiries, and any other classification or categorization.

Electronic messages may originate at any computing devices 109a to 109d, which are respectively associated with users 108a to 108d. In the example shown, user 108a may be associated with one or more computing devices, such as mobile computing device 105a or any type of computing device 109a, user 108b may be associated with one or more computing devices, such as mobile computing device 105b or any type of computing device 109b, user 108c may be associated with one or more computing devices, such as mobile computing device 105c or any type of computing device 109c, and user 108d may be associated with one or more computing devices, such as mobile computing device 105d or any type of computing device 109d. Note that any number of mobile and other types of computing devices may be configured to transmit and/or receive messages and are not limited to those shown. Any of mobile computing devices 105a to 105d and any of computing devices 109a to 109d may be configured to generate electronic messages to, for example, initiate moderation of those messages for inclusion in one or more data arrangements (e.g., in data storage) that constitute or implement an online community of messages.

Any one or more of message network computing systems 110a and 110b (including one or more applications) may be configured to receive and transmit electronic messages, regardless of a context, to convey an inquiry, experience, observation, request for assistance (e.g., in relation to a product or service), or any other information with or among any number of users for any reason. Such messages and content may be directed to resolving a problem via an inquiry, to providing experienced advice or suggestions (e.g., as an expert), to provide observations as an idea to, for example, improve a product or a service, to request for assistance, or to exchange any information among users 108a to 108d, whereby electronic message platform 160 and/or community syndication controller 161 may be configured to host and moderate, for example, peer-to-peer exchanges of messages using message moderation engine 164. Similarly, or equivalently, one or more of message network computing systems 110a and 110b may be configured to communicate electronic message content in any form in any digital media or channel 107a. Also, one or more computing systems 113a and 113b may be configured to communicate electronic message content in any form in any digital media or channel 107a. Also, electronic message platform 160, community syndication controller 161, and/or message moderation engine 164 may be configured to moderate electronic message content originating at computing systems 113a and 113b as well as message network computing systems 110a and 110b.

Note that in some examples, channels 107a may be publicly-accessible channels, whereas channels 107b may constitute secure, private, and/or and proprietary communication channels. As such, mobile computing devices 105a to 105d and computing devices 109a to 109d may be configured to submit electronic messages for posting in an online community via a secure data channel 107b.

In various examples, message network computing systems 110a and 110b may include any number of computing systems configured to propagate electronic messaging, including, but not limited to, computing systems including third party servers, such as third parties like Facebook™, Twitter™, LinkedIn™, Instagram™, Snapchat™, as well as other private or public social networks to provide social-media related informational data exchange services. Hence, message network computing systems 110a and 110b may include any social network computing system. Computing systems 113a and 113b (including one or more applications, such as text messaging applications) may be configured to provide any type of digital content, such as email, text messaging (e.g., via SMS messaging, Multimedia Messaging Service ("MMS"), WhatsApp™, WeChat™, Apple® Business Chat™, Instagram™ Direct Messenger, etc.), web pages (e.g., Facebook® websites and posts, Instagram® websites and posts, Twitter® websites and posts, etc.), audio (e.g., Spotify®-based content, etc.), video (e.g., YouTube™-based content, etc.), and any other content.

According to some examples, message network computing systems 110a and 110b may include applications or executable instructions configured to facilitate interactions (e.g., social interactions) amongst one or more persons, one or more subpopulations (e.g., private groups or public groups), or the public at-large. Examples of message network computing systems 110a and 110b may include the above-mentioned electronic accounts for Facebook™, Twitter™, LinkedIn™, Instagram™, and Snapchat™, as well as YouTube™, Pinterest™, Tumblr™, WhatsApp™ messaging, or any other platform, including Khoros® community, that may be configured to promote sharing of content, such as videos, audio, or images, as well as sharing ideas, thoughts, etc. in a socially-based environment, such as an online community moderated by implementing structures and functions of a message moderation engine 164 and/or any other component of electronic message platform 160 or entity computer system 150. According to some examples, content source computing systems 113a and 113b may include applications or executable instructions configured to promote an activity, such as a sports television network, a profession sports team, a news or media organization, a product producing or selling organization, and the like, or to promote sales or acquisition of goods or services. Content source computing systems 113a and 113b may implement websites, email, chat bots (e.g., "bots"), or any other digital communication channels, and may further implement electronic accounts to convey information via message network computing systems 110a and 110b.

In some examples, structures and/or functions of message network computing systems 110a and 110b and content source computing systems 113a and 113b may be implemented to operate similarly or equivalently as each other. Any electronic message may include a "tweet" (e.g., a message via a Twitter™ computing system), a "post" (e.g., a message via a Facebook™ computing system), or any other type of social network-based messages, along with any related functionalities, such as forwarding a message (e.g., "retweeting" via Twitter™), sharing a message, associating an endorsement of another message (e.g., "liking" a message, such as a Tweet™, or sharing a Facebook™ post, etc.), and any other interaction that may convey or otherwise may generate a "response" or electronic posts to an online community from one or more electronic accounts at relatively increased rates of transmissions or propagation to address concerns or statements that may otherwise affect a reputation of a brand. As such, message moderation engine 164 may be configured to moderate electronic posts to ensure compliance with policies, terms of use, legal regulations, and any other rule. According to various examples, an electronic message received via a network 111 can include any type of digital messaging that can be transmitted over any digital network (e.g., the Internet, etc.).

Entity computing system 150 is shown to include a computing device 120 and display configured to generate a user interface, such as a message moderation interface 122. Entity computing system 150 may also include a server computing device 152, which may include hardware and software, or a combination thereof, configured to implement an electronic message platform 160 configured to moderate a queue of electronic messages based on a user input that may be configured to perform multiple actions. In some examples, a user input to perform multiple actions may be a common user input, which may include a common gesture, such as a movement or interaction of one or more portions of a user 121 (e.g., a motion of a finger in one direction, and, optionally a reverse direction). Hence, a gesture, as a user input into a gesture-based interface, may facilitate moderation of electronic messages 130 and 134, at least in some examples. In various examples, user 121 may be an agent acting in a role of a "moderator," or as a user in any other function or role (e.g., a supervisory moderator, a quality control moderator, etc.).

Message moderation engine 164 may be configured to include logic to cause generation of a message moderation interface 122 at a computing device 120 to facilitate moderation or filtering of one or more electronic messages. Message moderation interface 122 may be configured to receive user input 124 to activate or enable automatic disposition (e.g., "auto disposition") or automatic application of an action, such as automatically approving an unmoderated electronic message as one or more portions of an electronic message translates (e.g., visually moves or scrolls) to a specific position relative to a portion of interface 122. For example, automatic approval of an unmoderated electronic message may be implemented when any or all portions of a message transitions into a post-view set of messages 127b (e.g., responsive to a gesture). According to some examples, message moderation engine 164 may include logic that constitutes a computer program or set of executable instructions for a moderator application.

In some examples, message moderation engine 164 may be configured to access unmoderated electronic messages 130 and 134 for disposition in a queue 124 of electronic messages for moderation. As shown, message moderation interface 122 may include a viewable area bounded by a distance 123 over which one or more images of an electronic post may be accessed, reviewed, and acted upon, according to various examples. Distance 123 may be a function of a direction of, for example a gesture or user input. A viewable area of interface 122 may correlate to a coordinate system or a grid of pixels relative to, for example, a reference 125. Note, too, that viewable area of interface 122 may represent a display field or matrix of pixels. As an example, a position of a generated image that may be presented or displayed within message moderation interface 122 may be referenced relative to a reference point 125. Reference point 125 may serve as an origin (e.g., having a coordinate of 0,0) for a Y-axis and an X-axis. Thus, values of Y may extend from Yn (e.g., a minimum Y value) adjacent a bottom edge of message moderation interface 122 to Yx (e.g., a maximum Y value) adjacent a top edge of message moderation interface 122. Further, values of X may extend from Xn (e.g., a minimum X value) adjacent a left edge to Xx (e.g., a maximum X value) adjacent a right edge of message moderation interface 122. Note that descriptions, as shown, of a "bottom" edge (i.e., at which Y is Yn, such as a "0th" pixel value), a "top" edge (i.e., at which Y is Yx, such as a "1920th" pixel value), a "right" edge, and a "left" edge are not intended to be restrictive, but rather, descriptive of an example of delineations between, for example, non-viewable content and viewable content of a queue 124 of electronic messages 140 to 146, as applied to a moderator application.

According to some examples, a moderator application may be configured to establish queue 124 of electronic messages 140 to 146, and filter queue 124 of one or more electronic messages (e.g., unmoderated electronic messages) to identify whether to apply an one or more actions (e.g., at least one of which may be performed automatically) in association one of electronic messages 140 to 146 (e.g., unmoderated electronic messages). In at least one implementation, a moderator application (e.g., message moderator engine 164) may be configured to identify data representing each of electronic messages 140 to 146 to generate images for presentation in message moderation interface 122. In the example shown, queue 124 of electronic messages may represent data stored in memory that constitutes queue 124, whereby image data representing electronic message 140 and a portion of electronic message 141 may, at a point of time (e.g., prior to a user input), be associated with a non-viewable region, such as one of pre-view messages 127a (e.g., prior to presentation in message moderation interface 122). Also, image data representing electronic message 146 and a portion of electronic message 145 may also be a non-viewable region, such as one of post-view messages 127b (e.g., subsequent to presentation in message moderation interface 122). Note, however, electronic messages 142, 143, and 144 are viewable as presented or displayed in message moderation interface 122.

A user input signal may originate at computing device 120 that is configured to implement a user interface as a computerized tool (or a distributed portion thereof), whereby a user input signal may be received into a moderator application (e.g., message moderation engine 164) to facilitate a moderated action. In some examples, a moderated action may be configured to cause assignment of an approved state automatically to an electronic message, thereby "automatically" approving the electronic message. For example, an approved state may indicate that unmoderated content is transformed into moderated content, thus approved content. According to some implementations, a user input signal may be configured to cause presentation and termination of one or more portions of an electronic message, whereby the user input signal may originate from a user input (e.g., a common user input, such as a single or unitary input with which to perform an automatic action, or multiple automatic actions).

In at least one example, a user input signal may originate from a gesture-based user input, such as a touch-sensitive screen or display, a touch-sensitive pad (e.g., a touch pad), or any other gesture-based user input as well as any other type of user input (e.g., other than gesture-based user inputs). In diagram 100, user inputs may be represented as implementing, for example, scrolling inputs 126a and 126b in one direction (e.g., scrolling from a bottom edge to a top edge), whereas scrolling input 126c may represent implementation of a common user input in, for example, a reverse direction (e.g., scrolling from a top edge toward a bottom edge). According to some examples, scrolling inputs 126a to 126b may be effectuated by detecting movement of a finger in a specific direction in association with a touch-sensitive user input (or any other gesture-based user input, including contactless gesture interfaces).

Further to the example set forth in diagram 100, consider that electronic message 143 (i.e., Post #0399) may originate in pre-view message region 127a of queue 124. Responsive to a user input 126a (or one or more user inputs 126a of a common user input), electronic message 143 may transition (e.g., from a non-accessible, but viewable state) to an accessible state. In some examples, user input 126a may cause an image of electronic message 143 to transition from a first region (or position) to a second region (or position). Upon transitioning into an accessible state, electronic message 143 may be identified using a given color, shape, size, or any other visual or perceptible indicator 148. As such, different types of indicators may be used and are not limited solely to those that are visual. In an accessible state, electronic message 143 may be associated with a subset of one or more user other inputs 147, which may be activated to perform one or more alternative actions. For example, a moderator 121 may identify an issue with electronic message 143 and activate a user input to, for example, reject, modify (e.g., edit), or forward electronic message 143, whereby a forwarded message may be transmitted to a specialized or supervisory moderator. Or, other user inputs 147 may be configured to implement any other action. Upon implementation of an alternative action, notifications of rejections, modifications, and the like may be transmitted via messages 132 and 136 to originating computing devices 105 and 109 that may have submitted an electronic message or post.

An alternative action may be activated responsive, for example, to non-compliant or violative content. For example, moderator 121 may cause a gesture indicative of a disapproved or rejected electronic message or post as violating one or more policies or, perhaps, a specific policy or term or use (e.g., content contains hate-related speech, includes pornographic images, includes prurient content, or the like). The gesture (e.g., a touch-sensitive user input, or scrolling using a mouse or scroll wheel) may indicate that an electronic message or post is to be moved within a given region of an interface 122. In response, the electronic message or post may be deleted and message 132 or 136 is sent back to the submitting user 108 indicating deletion/refusal and, in some examples, a specific policy, rule, or regulation that indicates why the electronic message or post has been refused for posting during a moderation process.

Note, however, if moderator 121 or message moderation interface 122 of computing device 120 do not cause activation of an alternative action in an accessible state, then another user input 126b may cause electronic message 143 to exit the accessible state. Responsive to a user input 126b (or one or more user inputs 126b of a common user input), electronic message 143 may transition (e.g., from an accessible and viewable state) to a non-accessible state, or to an approved state automatically (e.g., using a common user input or gesture). In some examples, user input 126b may cause an image of electronic message 143 to transition from a second region (or position) to a third region (or position), whereby the transition relative to the third region may cause an automatic action to be applied to electronic message 143 (e.g., an action to automatically approve electronic message 143, or to automatically apply any other default or predicted action).

In some examples, a moderator application (e.g., message moderation engine 104) may be configured to detect one or more user inputs 126c, which may be a common user input (e.g., same as user inputs 126a and 126b), but optionally in a different or reverse direction. For example, a common user input may be a "moving" or "scrolling" gesture relative to, for example, a touch-sensitive user input. As such, user inputs 126a, 126b, and 126c may be implemented using the same gesture or user input regardless of direction (e.g., user input 126c may be in a reverse direction relative to user inputs 126a and 126b). User input 126c (and associated signal) may be configured to cause presentation of any portion of an electronic message, such as electronic message 143, in message moderation interface 122 subsequent to scrolling that message into a post-view message region 127b. As such, user input 126c may be configured to cause re-display of at least a portion of electronic message 143, which had been previously approved automatically. In some examples, user input 126c may cause electronic message 143 to enter a review state in which moderator 121 may review a previously-approved electronic message. Subsequently, after a review of re-displayed electronic message 143, user inputs 126b may be implemented to again approve automatically that message for publication into a community of electronic messages and posts.

In view of the foregoing, structures and/or functionalities depicted in FIG. 1 as well as other figures herein, illustrate one or more applications, algorithms, systems and platforms to leverage or otherwise implement common user inputs, such as common gestures, to cause one or more actions automatically to be applied to an electronic message or post under moderation and review, according to some embodiments.

According to one or more examples, a moderation application and its functionalities (as well as any other functionalities described herein) are configured to reduce user behavior required to moderate content for posting to one or more social media networks, using one or more software platforms on computing devices over one or more distributed data networks (e.g., cloud-based data networks) to review, approve, reject, or perform other actions automatically on individual electronic messages submitted for posting without performing active actions (e.g., mouse or button clicks, or employing multiple different inputs in a touch-sensitive interface). Rather, a moderation application may be implemented to employ a gesture-based user interface to correlate a user input (e.g., a common user input) to select and approve actions to be performed automatically based on values of the user input. As such, an electronic message may be automatically approved without requiring different manual user inputs, thereby obviating a need to select an "approve" user input interface element.

Implementation of a moderator application, as described herein, may reduce or negate fatigue that otherwise may afflict moderators 121, which, in turn, may reduce or negate lapses of focus, inadvertent posts, errors, and the like. This may enhance user efficiency and accelerate a moderation process. Therefore, a moderation application may effectuate a computerized tool that may reduce cost and resources that otherwise may be necessitated to, for example, review and correct posts. Further, a moderator application may facilitate preservation of the reputation, trustworthiness, and reliability of an online community.

Note that message moderation interface 122 may implement, for example, functionalities provided by Khoros® Manage View user interface and a Khoros® Community software platform. Any of described elements or components set forth in FIG. 1, and any other figure herein, may be implemented as software, applications, executable code, application programming interfaces ("APIs"), processors, hardware, firmware, circuitry, or any combination thereof.

Figure 2:
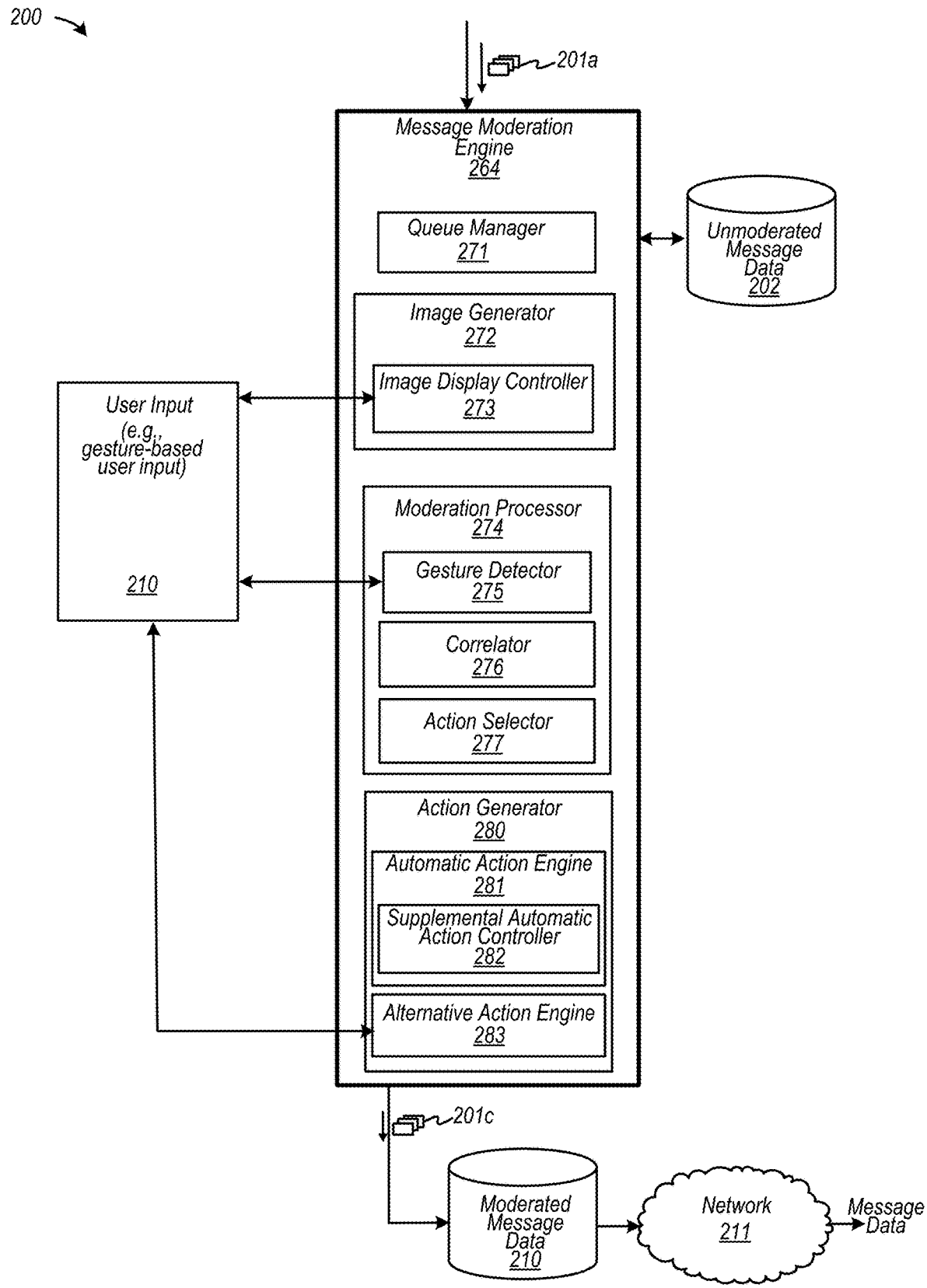
FIG. 2 depicts an example of a message moderation engine, according to various examples.

FIG. 2 depicts an example of a message moderation engine, according to various examples. Diagram 200 depicts a message moderation engine 264 configured to, at least in some examples, provide functionalities of a moderator application, whereby moderated electronic messages 201a and posts may be received and stored in a repository or memory, such as an unmoderated message data repository 202. Further, message moderation engine 264 may be configured to generate a moderated electronic message 201c or post for storage in a moderated message data repository 210, which may store a data arrangement that constitutes an online community. As such, moderated electronic message 201c may be viewable or accessible via any network 211 as message data to any authorized member of an online community.

Diagram 200 depicts a message moderation engine 264 including a queue manager 271, an image generator 272, a moderation processor 274, and an action generator 280. Queue manager 271 may include logic configured to manage storage of unmoderated electronic messages 201a in unmoderated message data repository 202. Further, queue manager 271 may also include logic configured to fetch data representing unmoderated messages from repository 202 for image processing to display a formatted electronic message as part of a queue of electronic messages under moderation, as displayed in a moderator user interface. In accordance with some embodiments, queue manager 271 may be configured to arrange electronic messages for moderation as a function of a message attribute, such as a level of priority, or any other message attribute.

Image generator 272 may include logic configured to receive data representing unmoderated messages from queue manager 271, whereby the logic may be further configured to generate a queue of electronic messages including any type of content, such as text, audio, video, graphics, etc. In some examples, image generator 272 may generate data representing a queue of electronic messages including viewable and non-viewable imagery in preparation for display in a user interface. As shown, image generator 272 may include an image display controller 273 that may be configured to receive data representing values of user input data from a user input 210 associated with a user interface. Responsive to user input data, image display controller 273 may be configured to cause presentation of electronic messages, and portions thereof, in a viewable area of a user interface so as to facilitate moderation.

In some examples, user input 210 may be configured to generate gesture-based user input data (e.g., that can be embodied in an associated user input data signal). As such, user input 210 may be activated based on any number of gestures, such as scrolling, pinching, and tapping, as well as tipping, shaking, or tilting a device, among other gestures. In some examples, a gesture-based user input may be activated responsive to eye movement (e.g., eye-gaze tracking), or to motion of any part of a user (e.g., with or without direct contact).

Moderation processor 274 may include a gesture detector 275, a correlator 276, and an action selector 277, according to at least some examples. In various examples, moderation processor 274 may be configured to determine and/or assign a state (e.g., an accessible state, an approved state, etc.) for an electronic message as a function of data values of a user input signal received from user input 210. Gesture detector 275 may be configured to receive user input signal data from user input 210 to determine a region or position (e.g., relative to a reference) for any electronic message or post presented in a viewable area of a user interface. Correlator 276 may include logic configured to detect a region or position of an electronic message (or any portion thereof), and to correlate the region or position to one or more automatically-invoked actions (e.g., based on the user input, such as a common user input). Action selector 277 may be configured to receive data representing a correlation between a detected set of user input data values and actions (e.g., automatic actions) that are configured to trigger or otherwise activate as a function of the set or range of user input data values. Thus, action selector 277 may be configured to activate an action automatically (e.g., responsive to a common user input data signal) or to activate an alternative action based on, for example, receiving other user inputs (e.g., to reject, to edit, etc.) based on accessibility to an electronic message under moderation.

Consider an example in which gesture detector 275 may be configured to detect a first subset of values of a user input signal, whereby the first subset of values of a user input signal may be configured to cause presentation of an electronic message (or a portion thereof) in a user interface for a moderator. In some examples, correlator 276 may be configured to correlate a first subset of values to a range of values responsive to detected values of a signal. In some examples, correlator 276 may detect a range of pixels, each pixel being uniquely identifiable relative to a reference (e.g., a bottom edge of a viewable area of a user interface, such as Y=Yn of FIG. 1). Based on a detected range of pixels, or a displacement of a number of pixels (or any other unit of an image) relative to a reference, correlator 275 may be configured to identity that an action correlates with a detected range of pixels. In some implementations, one or more ranges of pixels may correlate to one or more corresponding actions, one or more of which may be activated automatically.

In one example, correlator 276 may be configured to correlate user input data that may position an electronic message in a user interface at a region associated with a first range of pixel values, the first range of pixel values being associated with an accessible state. In response, action selector 277 may be configured to cause that electronic message to receive other user inputs to invoke alternate actions (e.g., to reject, edit, or forward a post), whereby action selector 277 may be activated to select a corresponding action to be performed. In another example, correlator 276 may be configured to correlate a second subset of user input data that may position an electronic message in a user interface in another region that may be associated with a second range of pixel values. The second range of pixels values may be associated with an approved state. In response, action selector 277 may be configured to cause approval of the electronic message, thereby enabling an approved electronic message to be published into an online community. In yet another example, correlator 276 may be configured to correlate a third subset of user input data that may re-position an electronic message in a visible area of a user interface so that an electronic message, such as a previously-approved message, may be reviewed and/or accessed. In some cases, the third subset of user input data may be similar or equivalent to the first subset or the second subset of data, but may be associated with a user input data signal indicative of scrolling in a reverse direction.

Action generator 280 may include logic configured to implement any number of actions responsive to any user input. In some examples, action generator 280 may be configured to implement one or more actions automatically as a function of the user input signal. Action generator 280 may include an automatic action engine 281, which, in turn, may include a supplemental automatic action controller 282. In addition, action generator 280 may include an alternative action engine 283. Automatic action engine 281 may be configured to receive a signal from action selector 277 to implement or execute an action automatically as a function a region or position at which an electronic message (e.g., in a queue) may be detected in a viewable area of a user interface. For example, automatic action engine 281 may activate any of a multiple number of actions automatically based on detected subsets of user input signal values, whereby differently detected subsets of user input signal values may automatically invoke actions based on an accessible state or an approved state of an electronic message under moderation. Automatic action engine 281 may be configured to activate supplemental automatic action controller 282 to automatically implement a supplemental action, such as causing review of a previously-reviewed electronic message that may be scrolled down into a viewable area of a user interface for further review. Alternative action engine 283 may be activated in response to one or more user inputs associated with an electronic message in an accessible state, whereby the one or more user inputs may cause an accessible electronic message to be rejected, to be edited, to be forwarded, or the like.

Figure 3:
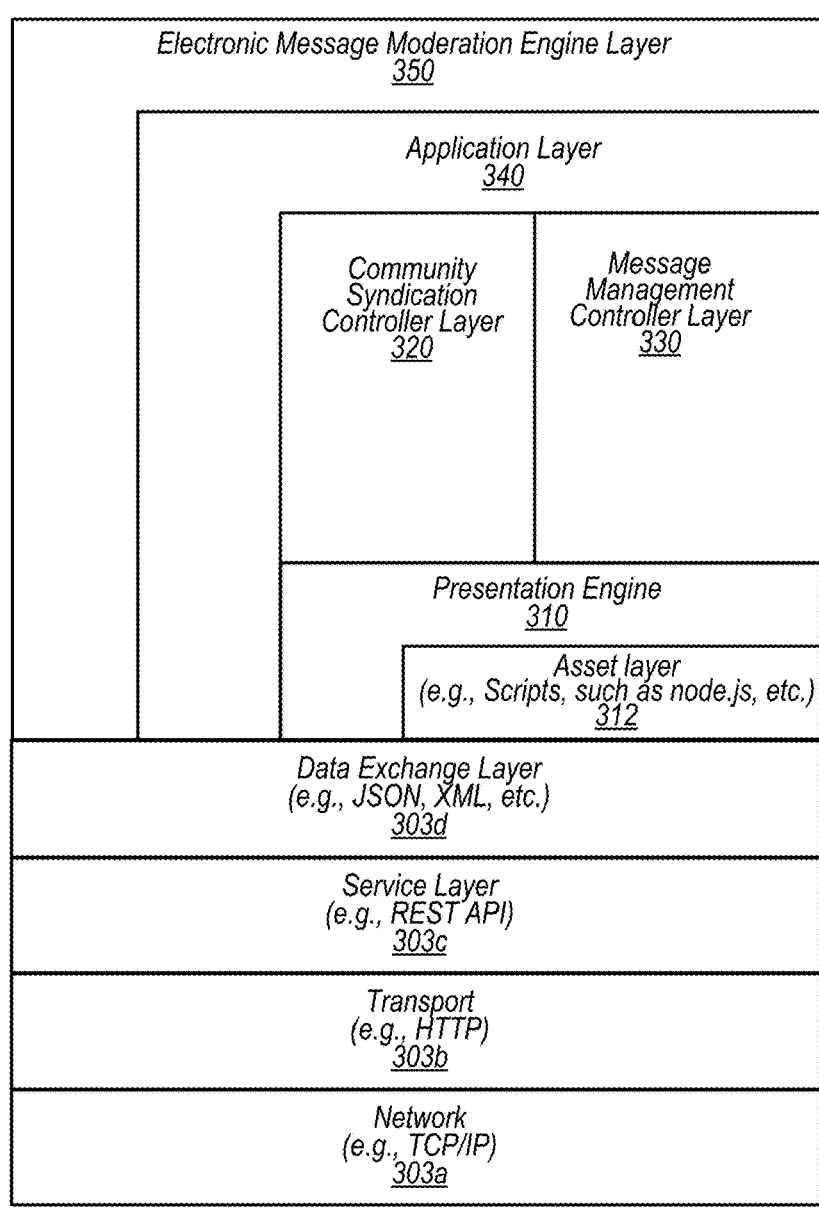
FIG. 3 illustrates an exemplary layered architecture for implementing a moderator application, according to some examples.

FIG. 3 illustrates an exemplary layered architecture for implementing a moderator application, according to some examples. Diagram 300 depicts application stack ("stack") 301, which is neither a comprehensive nor a fully inclusive layered architecture for moderating electronic posts and messages of an online community or social media network, including performing automatic actions using, for example, gesture-based user inputs or the like. One or more elements depicted in diagram 300 of FIG. 3 may include structures and/or functions as similarly-named or similarly-numbered elements depicted in other drawings, or as otherwise described herein, in accordance with one or more examples, such as described relative to FIG. 1 or any other figure or description herein.

Application stack 301 may include an electronic message moderation engine layer 350 upon application layer 340, which, in turn, may be disposed upon any number of lower layers (e.g., layers 303a to 303d). Electronic message moderation engine layer 350 may be configured to provide functionality and/or structure to implement a moderator application, as described herein. Electronic message moderation engine layer 350 and application layer 340 may be disposed on data exchange layer 303d, which may implemented using any programming language, such as HTML, JSON, XML, etc., or any other format to effect generation and communication of requests and responses among computing devices and computational resources constituting an enterprise and an enterprise resource planning application and/or platform. Data exchange layer 303d may be disposed on a service layer 303c, which may provide a transfer protocol or architecture for exchanging data among networked applications. For example, service layer 303c may provide for a RESTful-compliant architecture and attendant web services to facilitate GET, PUT, POST, DELETE, and other methods or operations. In other examples, service layer 303c may provide, as an example, SOAP web services based on remote procedure calls ("RPCs"), or any other like services or protocols (e.g., APIs). Service layer 303c may be disposed on a transport layer 303b, which may include protocols to provide host-to-host communications for applications via an HTTP or HTTPS protocol, in at least this example. Transport layer 303b may be disposed on a network layer 303a, which, in at least this example, may include TCP/IP protocols and the like. Note that in accordance with some examples, layers 303a to 303d facilitate implementation of a risk management data channel as set forth herein.

As shown, electronic message moderation engine layer 350 may include (or may be layered upon) an application layer 340 that includes logic constituting a community syndication controller layer 320, a message management controller layer 330, a presentation engine 310, and an asset layer 312. According to some examples, community syndication controller 320 may include logic to implement an online community, such as the Lithium Community (formally of Lithium Technologies, LLC), Khoros Communities of Khoros, LLC of Austin Tex., or "Atlas" Communities of Khoros, LLC of Austin Tex., among other online community configurations. Further, message management controller layer 330 may include logic to implement at least some functionality provided by an application configured to operate in accordance with "Modern Chat"-related technologies and "Khoros Care"-related technologies, both of Khoros, LLC of Austin Tex., among other technologies. Presentation engine layer 342 may include logic configured to facilitate presentation of electronic messages, as well as associated functionalities (e.g., to detect position or ranges of pixels associated with a displayed electronic message under moderation). In some examples, an asset layer 312 may be configured to implement node.js, which may be a cross-platform, JavaScript runtime environment. Is some cases, node.js may execute JavaScript code independent of a browser, or any other protocol, any other programming language, or any other set of executable instructions. Node.js is maintained by the Linux Foundation of San Francisco, Calif., USA.

Any of the described layers of FIG. 3 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by Khoros, LLC, or the like. The above described techniques may be varied and are not limited to the embodiments, examples or descriptions provided.

Figure 4:
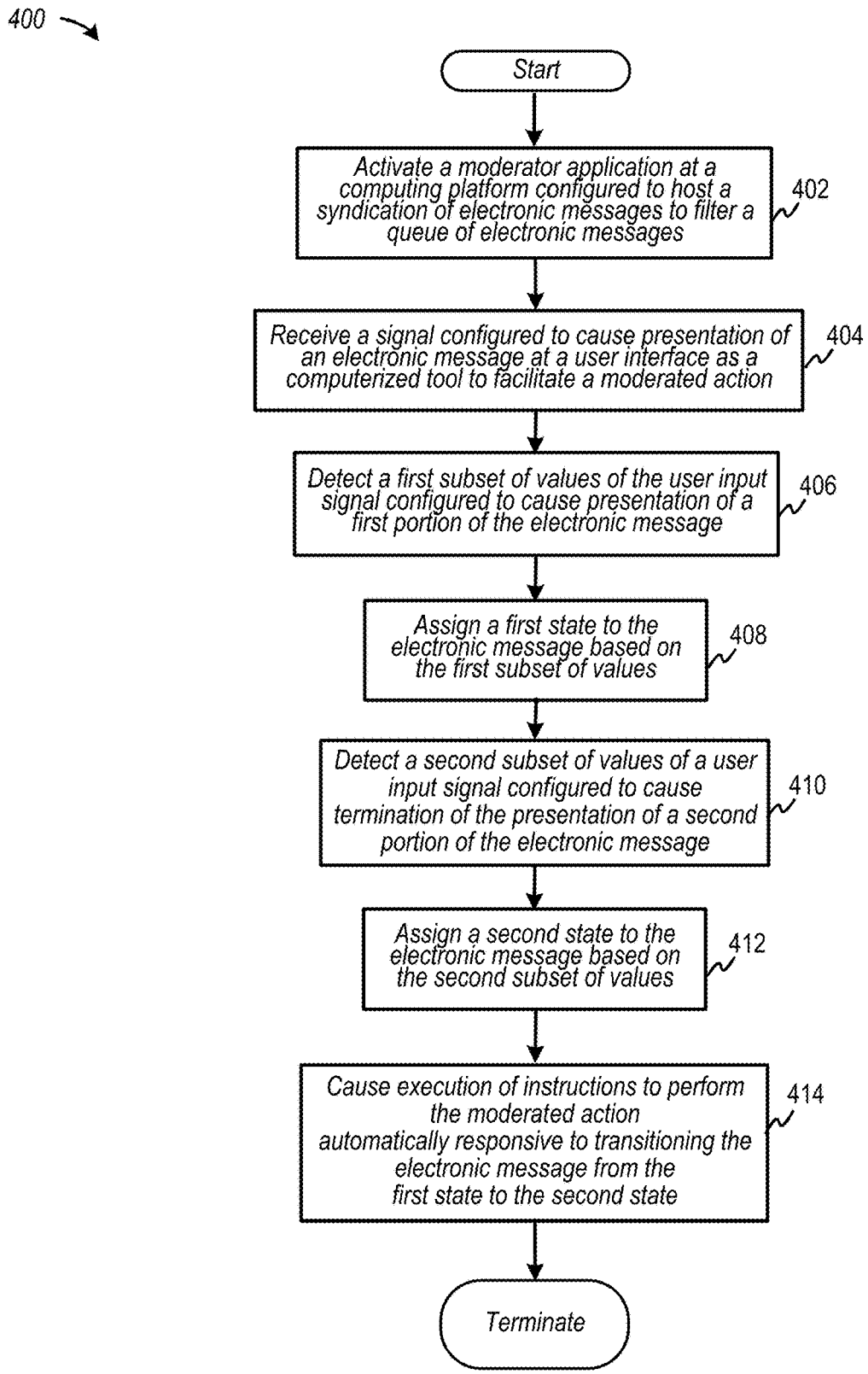
FIG. 4 is a flow diagram as an example of moderating an electronic message, according to some embodiments.

FIG. 4 is a flow diagram as an example of moderating an electronic message, according to some embodiments. Flow 400 may be an example of facilitating moderation of electronic messages, postings, content, etc., to determine whether to include electronic messages in an electronic community (or any subset thereof). In some examples, a subset of an electronic community (e.g., online community) may include any number of electronic messages or posts that may relate to each other by subject matter or any other classification. As an example, an online community may be subdivided based on whether content relates to a "forum" (e.g., content directed to resolving a problem), an "idea" (e.g., content directed to proposed suggestions related to any item, such as a product), a "frequently-asked question" (e.g., content directed to searchable solutions that are determined to be effective), an "expert" classification (e.g., directed to users or electronic accounts associated with expert-based content), and any other classification or categorization.

At 402, a moderator application (or a subset of executable instructions) may be configured to perform one or more actions automatically, such as approving an electronic message as a post in the electronic community, according to some examples. In some implementations, a moderator application may be implemented in association with a computing platform configured to host a syndication of subsets of electronic messages (e.g., an electronic community). A moderator application may be configured to filter a queue of one or more electronic messages (e.g., unmoderated electronic messages) to, for example, identify whether to apply an one or more actions (e.g., at least one of which may be performed automatically) in association electronic message (e.g., an unmoderated electronic message)

At 404, a user input signal may be received, whereby the user input signal may be configured to cause presentation of an electronic message at a user interface as a computerized tool to facilitate a moderated action of the moderator application. In some examples, a moderated action may be configured to cause assignment of an approved state automatically to an electronic message, thereby "automatically" approving the electronic message. For example, an approved state may indicate that unmoderated content is transformed into moderated content. According to some implementations, a user input signal may be configured to cause presentation and termination of one or more portions of an electronic message, whereby the user input signal may originate from a user input (e.g., a common user input, such as a single or unitary input with which to perform an automatic action, or multiple automatic actions). In at least example, a user input signal may originate from a scroll bar interface element (e.g., a vertical scroll bar) or a mouse-based user input, such as a mouse wheel configured to implement scrolling functionalities. Note, however, any other user input may be implemented. In some examples, touch sensitive-based user inputs may be implemented (e.g., touch-sensitive screens or touch-sensitive pads (e.g., touch pads)), as well as one or more voice-based or audio-based inputs (e.g., speech-to-text/input computer program). Another example of a user input may include eye-gaze detection and tracking devices and/or software, or any other technology configured to convey a user input to a moderator application.

At 406, a first subset of values of a user input signal may be detected, whereby the first subset of values of a user input signal may be configured to cause presentation of an electronic message (or a portion thereof) in a user interface. In some examples, a first subset of values may correlate to, or may be associated with, a range of values responsive to detected values of a signal.

At 408, a first state may be assigned to an electronic message based on a first subset of values. In at least one example, a first state associated with an electronic message may be indicative of an accessible state. An electronic message may be detectable in an accessible state in association with a user interface, whereby an electronic message may be accessible to receive another user input (e.g., a second user input). An example of another user input may be associated with activating a user interface element (e.g., a button) or causing a touch-sensitive input in a specific direction. In one example, another user input may not be activated or detected in association with an electronic message in an accessible state, whereby the electronic message may transition to a second state (e.g., automatically) responsive to a user input signal (e.g., a common user input signal). In another example, another user input may be activated or detected in association with an electronic message in an accessible state. In response, a moderator application may be configured to provide and detect the other user input (e.g., a second user input), which may be configured to transition an electronic message from a first state to a rejected state, an editable state, or a forwarded state, among others.

Responsive to detecting a user input to transition an electronic message to a rejected state, a moderator application can classify the message as "rejected," prevent the message from being transitioned into an "approved" state, generate a notification to transmit to an author of the message (i.e., notifying the author of rejection) with optional reasons to facilitate correction, and to implement any other function. Upon detecting a user input to transition an electronic message to an editable state, a moderator application can classify the message as "editable," enable a user (e.g., a moderator, an agent, or other users) to modify the message to, for example, redact a profane word. The moderator application can be further configured to generate a notification to transmit to an author of the message (i.e., notifying the author of a modification) and to implement any other function. Thereafter, the message may advance to an approved state, in at least some cases. Another user input may be configure to cause an electronic message to transition to a forwarded state, whereby a moderator application can be configured to classify the message as "forwarded," enable the message to be transmitted to another user (e.g., an expert moderator, a supervisory agent, or other users). Thereafter, the message may advance to an approved state, in at least some cases.

At 410, a second subset of values of a user input signal can be detected, whereby the second subset of values of a user input signal may be configured to cause termination of the presentation of at least a second portion of the electronic message in a user interface. In at least one example, detection of a first subset and a second subset of values of a user input signal may include computing displacement of a number of pixels (or any other unit of an image) relative to a reference associated with the user interface, and detecting a displacement value a function of the number of pixels to determine a transition from at least one of the first state and the second state of the electronic message to another state. For example, a user interface element may be configured to cause an electronic message (or post) to modify its presentation by scrolling up in a first direction. In at least one other example, detection of a first subset and a second subset of values of a user input signal indicative of a position of an electronic message (or an image thereof), as presented or displayed on a user interface.

Further to 410, a first subset of values of a user input signal may be detected by, for example, detecting that a first subset of values may be indicative that a first portion of an electronic message is viewable in a user interface (e.g., a first portion of an electronic message may enter a user interface at a first edge of a user interface). A second subset values of a user input signal may be indicative that a second portion of an electronic message is not viewable in a user interface (e.g., a second portion of an electronic message may exit a user interface at a second edge of a user interface). In some implementations, a first edge and a second edge may be a bottom edge and a top edge, respectively, of a user interface (e.g., a viewable portion thereof).

At 412, a second state may be assigned to an electronic message based on a second subset of values of a user input signal. A second subset of values may include a range of values indicative of activating a transition to a second state (e.g., indicative of moderator intent). In some examples, a second state is an "approved" state At 414, execution of instructions may cause performance of a moderated action automatically responsive to transitioning an electronic message from a first state to a second state (e.g., from an accessible state to an approved state). In some examples, a third subset of values of a user input signal may be configured to cause presentation of any portion of an electronic message in a user interface (e.g., re-display of at least a portion of an electronic message). In some examples, a third subset of values may be detected subsequent to detecting a second subset values of a user input signal (e.g., subsequent to an approved state). Further, another state to an electronic message based on a third subset of values. In at least one example, the third subset of values may indicate a review of an approved electronic message. According to some examples, a third subset of values may be equivalent to (or overlap) one or more other subsets of values. A third subset of values may be equivalent to at least portions of either a second subset of values (e.g., to revoke approval) or a first subset of values (e.g., to re-access an electronic message in an accessible state). A third subset of values may be detected at a subsequent period or unit of time. In at least one case, detecting a third subset of values may include receiving a user input signal specifying data representing a reverse displacement of a number of pixels. As such, a user input signal may originate from a common user interface element, and may be in a second or reverse direction, such as scrolling down (e.g., a reversed direction) to pull down or re-display an approved electronic message through a top of a user interface.

Figure 5:
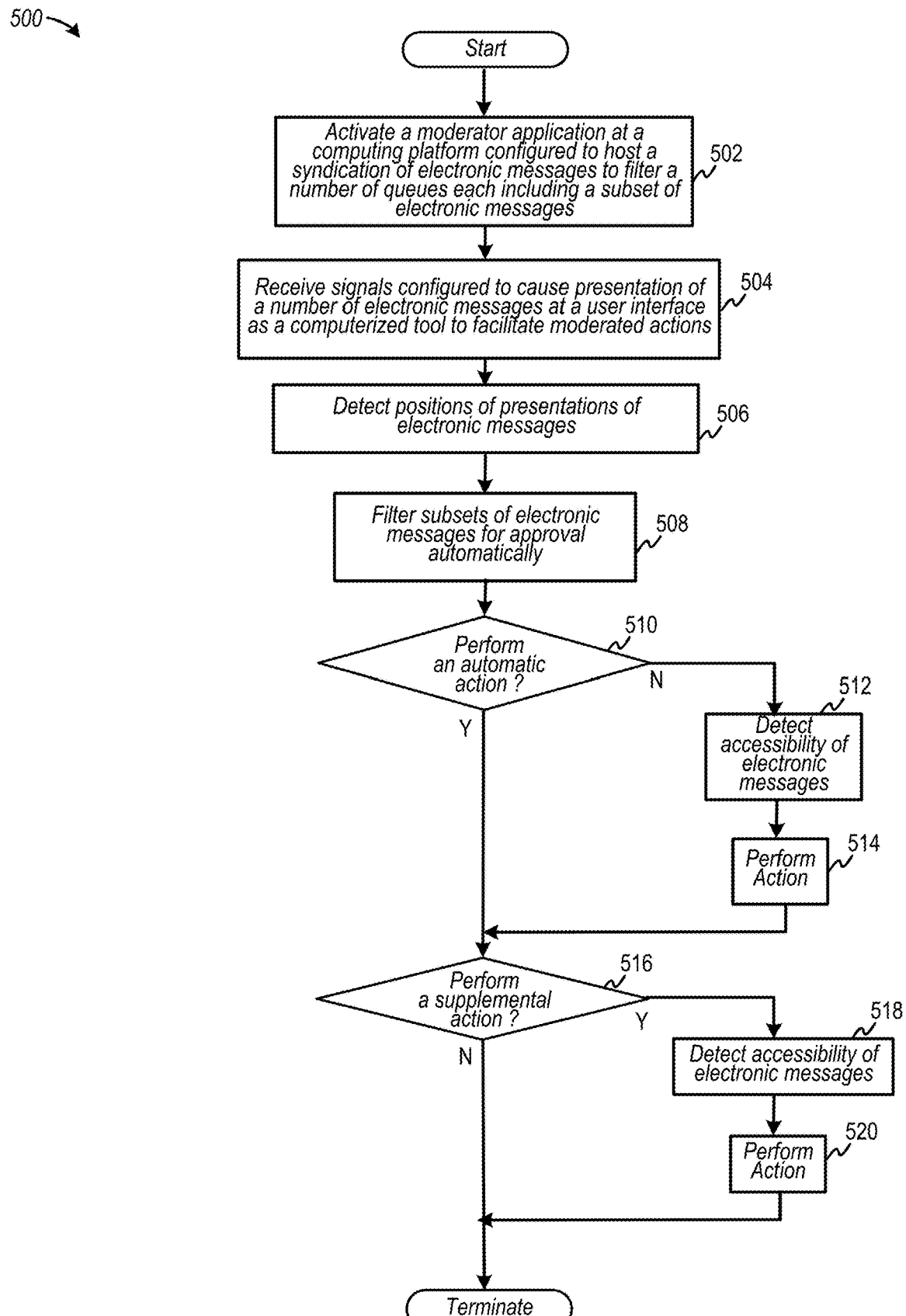
FIG. 5 is a flow diagram as another example of moderating a number of electronic message, according to some embodiments.

FIG. 5 is a flow diagram as another example of moderating a number of electronic message, according to some embodiments. Flow 500 may begin at 502, at which a moderator application may be activated to filter a number of queues each including a subset of electronic messages. A moderator application may be implemented in association with a computing platform, which may be configured to host a syndication of electronic messages (e.g., an online community). At 504, signals configured to cause presentation of a number of electronic messages at a user interface may be received. In some examples, a moderator application implemented in electronic communication with a user interface may configure the user interface as a computerized tool to facilitate moderated actions.

At 506, positions at which to present electronic messages may be detected, whereby one or more positions may be indicative of one or more states that may activate one or more actions. At 508, subsets of electronic messages may be filtered to facilitate approval automatically of approved electronic messages.

At 510, a determination may be made as to whether to perform an automatic action, such as action that specifies that an electronic message is approved, for example, to post within an online community. If no, flow 500 may transition to 512, at which accessibility to electronic messages may be detected to enable performance of an action at 514. Examples of such actions include rejecting, modifying, or forwarding an electronic message. Otherwise, flow 500 may transition to 516, whereby performance of an automatic action may be indicative of approving an electronic message or post automatically (e.g., using a common user input).

At 516, a determination may be made as to whether to perform a supplemental action, such as action that specifies that an approved electronic message may be reviewed by, for example, re-displaying the electronic message in a user interface. If no, flow 500 may transition to termination, at which the approved electronic message or post may be published into an online community. If yes, flow 500 may transition to 518, whereby accessibility of electronic messages may be detected. Accessible message may be configured to receive other user inputs to perform other actions at 520 (e.g., other action including, but not limited to, rejecting, modifying, or forwarding an electronic message.

Figure 6:
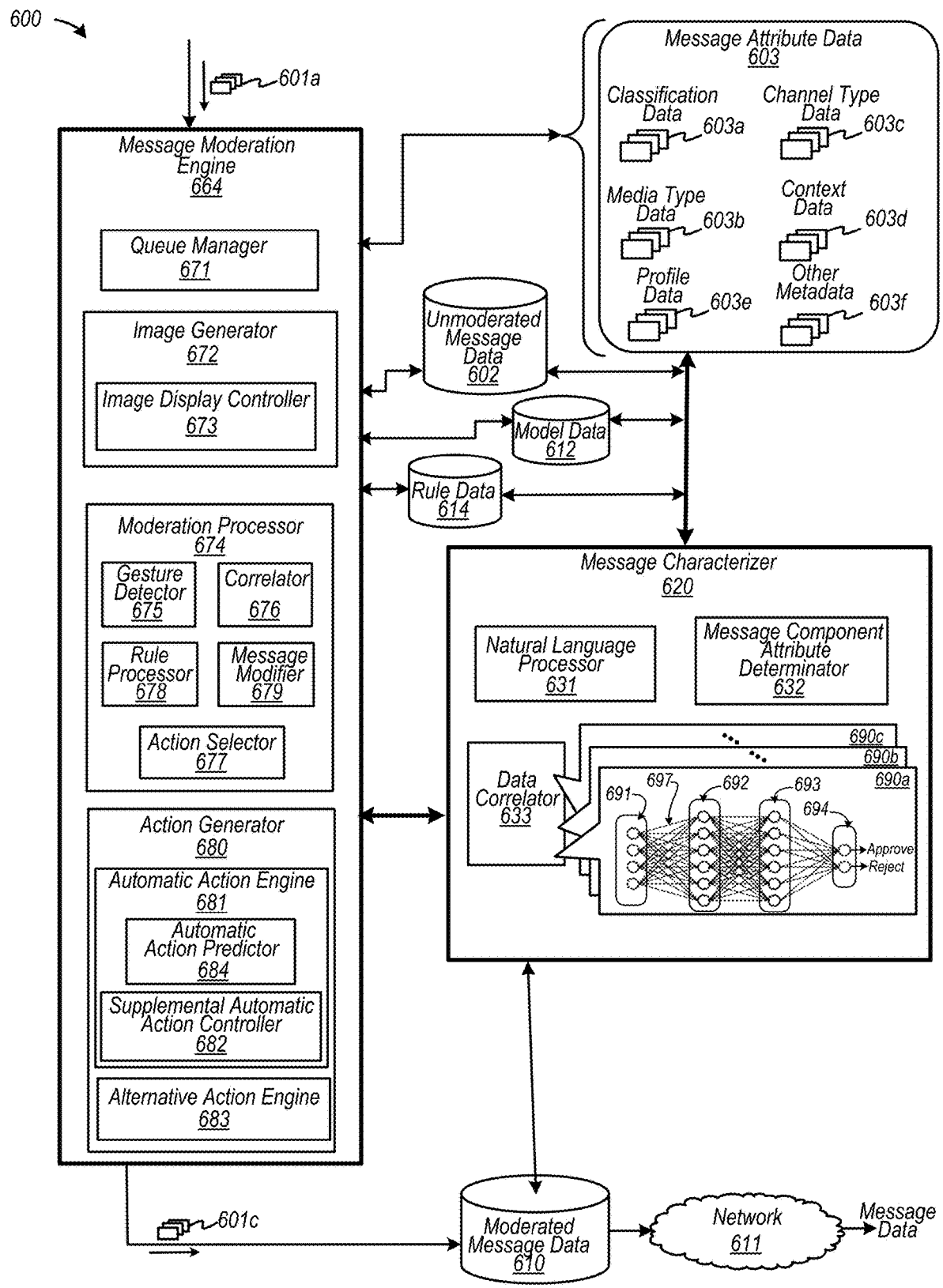
FIG. 6 depicts another example of a message moderation engine, according to various examples.

FIG. 6 depicts another example of a message moderation engine, according to various examples. Diagram 600 depicts a message moderation engine 664 configured to, at least in some examples, provide functionalities of a moderator application, whereby moderated electronic messages 601a and posts may be received and stored in a repository or memory, such as an unmoderated message data repository 602. Further, message moderation engine 664 may be configured to generate a moderated electronic message 601c or post for storage in a moderated message data repository 610, which may store a data arrangement that constitutes an online community. As such, moderated electronic message 601c may be viewable or accessible via any network 611 as message data to any authorized member of an online community.

Diagram 600 depicts a message moderation engine 664 including a queue manager 671, an image generator 672, a moderation processor 674, and an action generator 680. As shown, image generator 672 may include an image display controller 673, moderation processor 674 may include a gesture detector 675, a correlator 676, and an action selector 677, and action generator 680 may include an automatic action engine 681, which, in turn, may include a supplemental automatic action controller 682. In addition, action generator 680 may include an alternative action engine 683. Message moderation engine 664 may include structures and/or functionalities set forth in FIGS. 1 and 2, or any other figure, and may include additional structures and/or functionalities described in FIGS. 1 and 2 and elsewhere herein. In one or more implementations, elements depicted in diagram 600 of FIG. 6 may include structures and/or functions as similarly-named or similarly-numbered elements depicted in other drawings.

According to various examples, message moderation engine 664 may include other or additional functionality. For example, moderation processor 674 may include logic configured to implement a rule processor 678 and a message modifier 679, and automatic action engine 681 may include logic configured to implement an automatic action predictor 684.

In at least one embodiment, moderation processor 674 may be configured to provide automatically a modified electronic message or post in a user interface with which a moderator may review and approve automatically, based on a user input signal data and correlation thereto as described herein. In this case, moderation processor 674 may be configured to provide a "modification assist" functionality, whereby logic may be configured to propose modifications to an unmoderated message that a moderator may approve automatically (e.g., without activating another user input). For example, moderation processor 674 may be configured to detect a noncompliant message attribute, such as a typographical error or a profane word, and may be configured to propose a modified electronic message for approval. Rule processor 678 may be configured to access rule data in a rule data repository 614, whereby rule data may include any number of rules with which to analyze an unmoderated electronic message (or post) to determine whether to approve or modify the message (e.g., automatically).

Rule data stored in repository 640 may include data arrangements of various threshold values to determine whether an unmoderated message may comply with community terms (e.g., terms of use), conditions, policies, laws, regulations, rules, and the like. For example, rule data 614 may include rule data to reject, block, or redact variants of words, word stems, tokens (in any language), and the like, that may be profane, libelous, perjurious, hateful, and the like. Message modifier 679 may include logic configured to detect violations or breaches of terms or policies, and to modify an electronic message (e.g., by replacing words, images, etc., by redacting inappropriate content, etc., and the like). In one example, rule data stored in repository 640 may define threshold or conditions to determine whether an electronic message conforms with, for instance, the Americans with Disabilities Act ("ADA") or the like.

In at least one embodiment, an automatic action predictor 684 may include logic configured to provide "action assistance" to a moderator, whereby automatic action predictor 684 may predict whether to select or modify a default action to implement automatically a predicted disposition of an electronic message. As an example, automatic action predictor 684 may be configured to access model data 612 to compute or calculate, based on various attributes (e.g., message attribute data) of an electronic message, a predicted disposition of an electronic message, such as a prediction to approve, a prediction to reject, a prediction to edit, a prediction to forward, or any other predictive actions.

In some examples, message characterizer 620 may be configured to characterize one or more messages 601a to determine or predict various characterized message attributes with which to assist in modifying a message or assist in providing a predicted action during moderation of one or more electronic messages. In some examples, message characterizer 620 may be configured to characterize, for example, a "newly-received" message 601a for comparison against a data model in model data repository 612 to form a set of characterized data. Thus, message characterizer 620 may be configured to identify attributes and corresponding attributes that may be matched, as a data pattern, against patterns of data including correlated datasets stored in, for example, model data 612. Matching patterns may facilitate the correlation of message characteristics to assist in providing an optimal response during a moderation process. In various examples, one or more rules implemented in executable instructions may be configured to generate an optimized electronic message for review by a moderator.

Message characterizer 620 may be configured to characterize content of message 601a to identify or determine one or more attributes such as, for example, a status of an author or customer, a number of times an author or customer has had an electronic message rejected or modified, an associated URL, a referrer computing device, application, website, or link, one or more site visits, a number of days since a customer last interacted digitally with a website or application, an amount of time on a web page or web site, meta and cookie-related data, a location (including GPS coordinates, city, country, etc.), an operating system, a type of browser application, a device type (e.g., a hardware identification of a computing device), a MAC ID, an IP address, and other message attribute that may be characterized. One or more message characteristics may facilitate characterization or classification of unmoderated messages to, for example, optimize moderation processes at computing devices based on one or more detected or derived message characteristics. In some examples, message characterizer may derive a characteristic indicative of a priority value, or any other factor that may affect moderation of electronic messages.

Further, message characterizer 620 may be configured to detect and parse the various components of an electronic message, and further may be configured to perform analytics to analyze characteristics or attributes of one or more message components. As shown, message characterizer 620 may include a natural language processor 631 and a message component attribute determinator 632. Natural language processor 631 may be configured to ingest data to parse portions of an electronic message (e.g., using word stemming, etc.) for identifying components, such as a word or a phrase. Also, natural language processor 631 may be configured to derive or characterize a message as being directed to a particular topic or subject matter based on, for example, sentiment analysis techniques, content-based classification techniques, and the like. In some examples, natural language processor 631 may be configured to apply word embedding techniques in which components of an electronic message may be represented as a vector, which may be a data arrangement for implement machine learning, deep learning, and other artificial intelligence-related algorithmic functions.

Message component attribute determinator 632 may be configured to identify characteristics or attributes, such as message attribute data 603, for a word, phrase, topic, etc. In various examples, message attribute data 603 may be appended, linked, tagged, or otherwise associated with a component to enrich data in, for example, model data repository 612. A classification value may be a characteristic or an attribute of a message component, and thus may be used as a "tag." Examples of message attribute data 603 are depicted as classification data 603a (e.g., an attribute specifying whether a component or message may be classified as, for example, being directed to particular subject matter, or being direct to non-compliant messaging), media type data 603b (e.g., an attribute specifying whether a component may be classified as being associated with a Tweet™, an email, a post, a webpage, a text message, etc.), channel type data 603c (e.g., an attribute specifying whether a component may be associated with a type of social networking system, such as Twitter™), and the like. Message attribute data 603 may also include context metadata 603d, which may include attributes that specify environmental data or contextual data, such as a context in which an electronic message is received for submission into a particular community. For instance, context metadata 603d may include data representing a time of day, a year, a season, a subject matter-related context, a product-related context, an idea-related context, a solution-related context, a service-related context, a payment-related context, etc.

Also, message component attribute determinator 632 may be configured to generate a tag including metadata 603d may refer to a context in which a word is used in a transmission of a number of electronic messages (e.g., a tag indicating a marketing campaign, a tag directed to a particular community or sub-community, or the like). Also, a tag including metadata 603d may refer to an industry or activity (e.g., a tag indicating an electronic message component relating to autonomous vehicle technology, or basketball), etc. Furthermore, message attribute data 603 may also include profile data 603e, which may include attributes that describe, for example, demographic data regarding an author or a customer of a received electronic message, or the like. Other metadata 603f may be associated with, or tagged to, a word or other message component. As such, other metadata 603f may include a tag representing a language in which the word is used (e.g., a tag indicating English, German, Mandarin, etc.). In some cases, other metadata 603d may include data representing values of computed threshold values or classification values (e.g., a tag may indicate a value of an amount of likelihood of generating a response, etc.). Message attribute data 603, and the corresponding tags, may be stored in a data repository.

Data correlator 633 may be configured to statistically analyze components and attributes of electronic messages and posts bound for submission to a community to identify predictive relationships between, for example, an attribute and a value predicting a likelihood that an electronic message may invoke a specific predictive action, which may be moderated by an agent, a moderator, or the like. According to some embodiments, data correlator 633 may be configured to classify and/or quantify various "attributes" and/or "received electronic messages" (and exchanges thereof) by, for example, applying machine learning or deep learning techniques, or the like.

In one example, data correlator 633 may be configured to segregate, separate, or distinguish a number of data points (e.g., vector data) representing similar (or statistically similar) attributes or received electronic messages, thereby forming one or more sets of clustered data. Clusters of data (e.g., predictively grouped data) may be grouped or clustered about a particular attribute of the data, such as a source of data (e.g., a channel of data), a type of customer (e.g., a loyal customer), a degree of urgency for an issue (e.g., a customer is, a type of language, a degree of similarity with synonyms or other words, etc., or any other attribute, characteristic, parameter or the like. In at least one example, a cluster of data may define a subset of electronic messages having one or more similarities (e.g., a statistically same topic) that may be configured to characterize a class of messages for purposes of selecting and applying predictively one or more rules or more actions to unmoderated message 601a.

While any number of techniques may be implemented, data correlator 633 may apply "k-means clustering," or any other clustering data identification techniques to form clustered sets of data that may be analyzed to determine or learn optimal classifications of data and associated predictive responses thereto. In some examples, data correlator 633 maybe configured to detect patterns or classifications among datasets 633 and other data through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical or empirical technique).

In the example shown, data correlator 633 may be configured to implement any number of statistical analytic programs, machine-learning applications, deep-learning applications, and the like. Data correlator 633 is shown to have access to any number of predictive models, such as predictive model 690a, 690b, and 690c, among others. In this implementation, predictive data model 690a may be configured to implement one of any type of neuronal networks to predict an action or disposition of an electronic message under moderation, so as to minimize a number of different user inputs in use (e.g., to enhance moderator efficiency and reduce fatigue). In this case, a neural network model 690a includes a set of inputs 691 and any number of "hidden" or intermediate computational nodes 692 and 693, whereby one or more weights 697 may be implemented and adjusted (e.g., in response to training). Also shown, is a set of predicted outputs 694, such as "approve" or "reject," among any other type of output.

In view of the foregoing, rule processor 678 and message modifier 679 may be configured to operate to predictively or proactively suggest modifications to an electronic message, thereby enabling a moderator to forgo accessing a non-compliant electronic message to reject, or modify the electronic message. Further, automatic action predictor 684 may be configured to analyze characterized message data of electronic message 601a to provide a proposed default course of action or disposition of an electronic message. Therefore, an electronic message under moderation may be associated with a connotation of its predicted disposition, such as whether a message ought to be approved, reviewed, edited, rejected, forwarded, and the like. As such, a moderator may forego actively selecting an alternative action manually as automatic action predictor 684 may be configured to propose an alternative action that may be implemented automatically (e.g., automatically rejecting or editing a message).

Any of described elements or components set forth in FIG. 6, and any other figure herein, may be implemented as software, applications, executable code, application programming interfaces ("APIs"), processors, hardware, firmware, circuitry, or any combination thereof.

In some examples, computing devices using computer programs or software applications may be used to implement gesture-based community moderation, using computer programming and formatting languages such as Java®, JavaScript®, Python®, HTML, HTML5, XML, and data handling techniques and schemas. Moderation may be performed for various purposes ranging from reviewing/publishing content to moderating user posted content to a content, news, or video aggregation site such as YouTube® or a social media website or network such as Twitter®, Facebook®, Instagram®, Snapchat®, or others.

Figure 7:
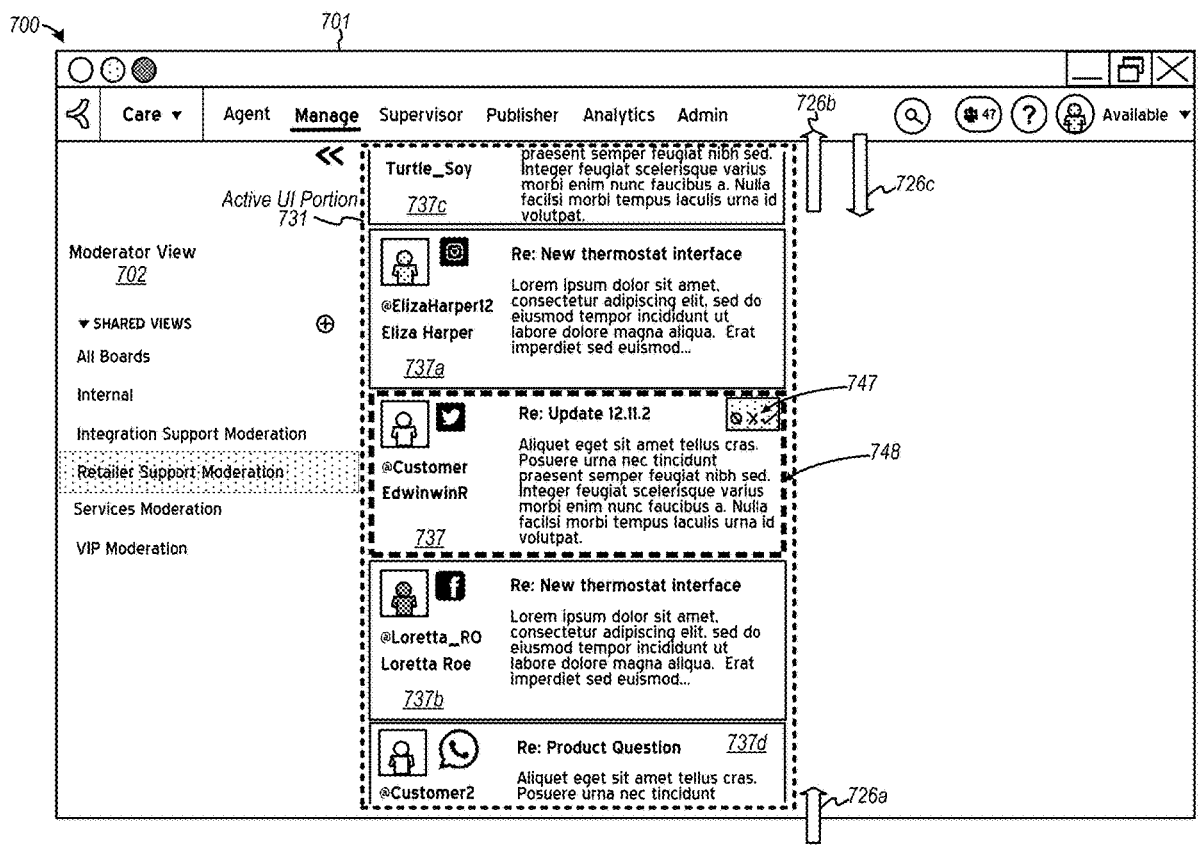
FIG. 7 depicts an example of a user interface configured to moderate electronic messages and posts, according to some examples.

FIG. 7 depicts an example of a user interface configured to moderate electronic messages and posts, according to various examples. Diagram 700 depicts a user interface 701 configured to moderate electronic messages (or posts) in accordance with various methods described herein. In this example, a user interface includes a portion 702 describing a specific moderator view indicating an associated queue of unmoderated electronic messages in an active user interface ("UI") portion 731. User interface 701 depicts a presentation of a number of electronic messages under moderation, such as messages 737d, 737b, 737, 737a, and 737c. User inputs, such as gesture-based user inputs 726a, 726b, and 726c may be configured to scroll messages 737d, 737b, 737, 737a, and 737c up and down, whereby one or more automatic actions may be applied to an electronic message. For example, electronic message 737 may be detected by a moderator application, as an example, as being displaced into a region or position that automatically assigns or places electronic message 737 into an accessible state. In this state, a visual indicator 748 indicates that electronic message 737 may be accessible in response to, for example, alternative actions activated by one or more user inputs 747. If no alternative actions are activated via user input 747, then one or more user input 726b may cause electronic message 737 to scroll off a visible area of user interface 701, thereby automatically approving that message.

Figure 8:
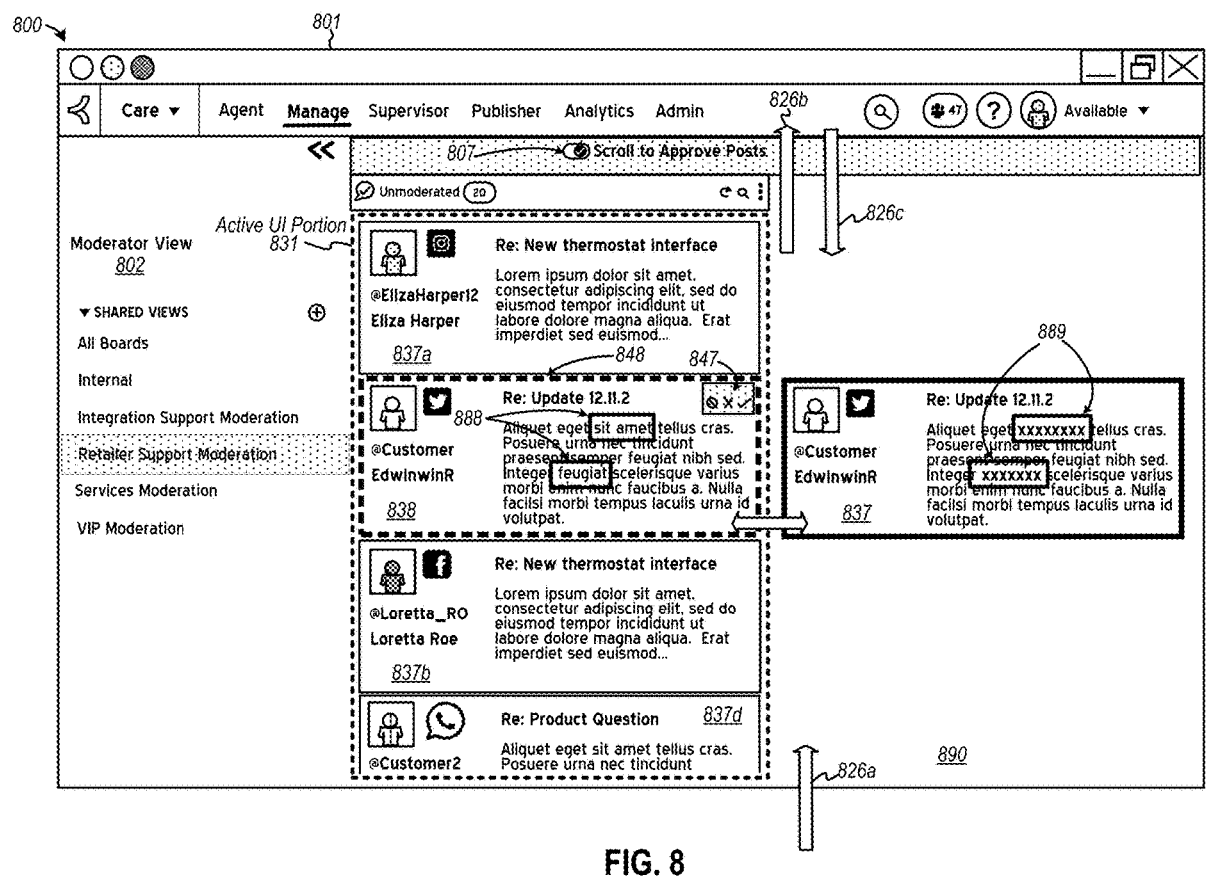
FIG. 8 depicts another example of a user interface configured to moderate electronic messages and posts using proposed modified electronic messages, according to various examples.

FIG. 8 depicts another example of a user interface configured to moderate electronic messages and posts using proposed modified electronic messages, according to various examples. Diagram 800 depicts a user interface 801 configured to moderate electronic messages (or posts) in accordance with various methods described herein. In this example, a user interface includes a portion 802 describing a specific moderator view indicating an associated queue of unmoderated electronic messages in an active user interface ("UI") portion 831. Note that user interface 801 includes a user input 807 to cause a moderator application to approve scrolled posts, or to disable that functionality.

User interface 801 depicts a presentation of a number of electronic messages under moderation, such as messages 837d, 837b, 838, 837a, and 837c in a queue, whereby message 838 is a modified version of original electronic message 837, which is presented or displayed at its side. In this example, a moderator application or other logic may be configured to detect inappropriate or noncompliant text 889, and propose alternative words or text 888. In this state, a visual indicator 848 indicates that electronic message 838 may be accessible in response to, for example, alternative actions activated by one or more user inputs 847, such as whether to undo or reject proposed alternate modifications 888. User inputs, such as gesture-based user inputs 826a, 826b, and 826c may be configured to scroll messages 837d, 837b, 838, 837a, and 837c up and down, whereby one or more automatic actions may be applied to an electronic message. If no alternative actions are activated via user input 847, then one or more user input 826b may cause electronic message 838 to scroll off a visible area of user interface 801, thereby automatically approving that a modified version of electronic message 837.

Figure 9:
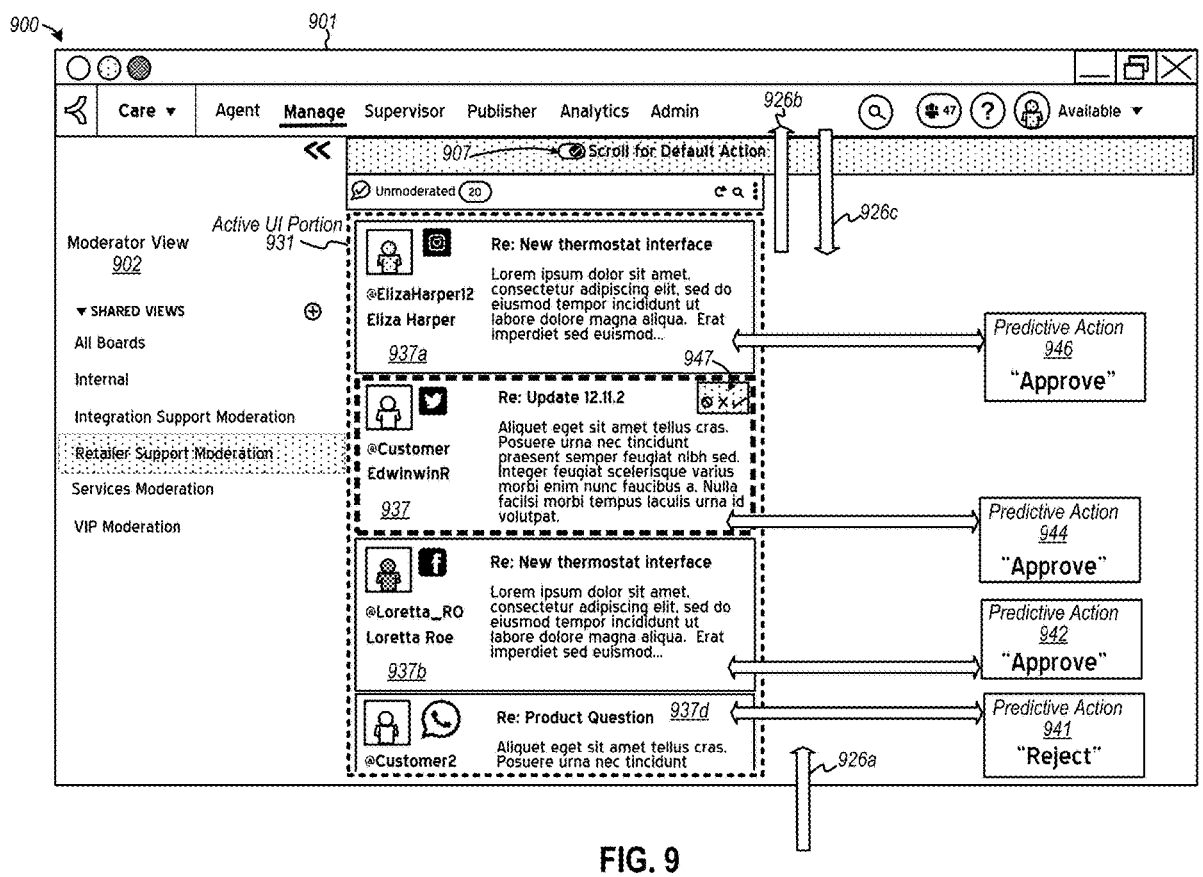
FIG. 9 depicts yet another example of a user interface configured to moderate electronic messages and posts using predictive default actions, according to various examples.

FIG. 9 depicts yet another example of a user interface configured to moderate electronic messages and posts using predictive default actions, according to various examples. Diagram 900 depicts a user interface 901 configured to moderate electronic messages (or posts) in accordance with various methods described herein. In this example, a user interface includes a portion 902 describing a specific moderator view indicating an associated queue of unmoderated electronic messages in an active user interface ("UI") portion 931. Note that user interface 901 includes a user input 907 to cause a moderator application to automatically apply a predicted default action to posts scroll up beyond visibility of user interface 901, or to disable that functionality.

User interface 901 depicts a presentation of a number of electronic messages under moderation, such as messages 937d, 937b, 937, and 937a in a queue, whereby a moderator application predictively calculates predictive default actions each of the messages. For example, messages 937d, 937b, 937, and 937a are shown to be associated with predicted default actions ("Reject") 941, ("Approve") 942, ("Approve") 944, and ("Approve") 946, respectively. User inputs, such as gesture-based user inputs 926a, 926b, and 926c may be configured to scroll messages 937d, 937b, 937, and 937a up and down, whereby one or more automatic actions and dispositions may be applied to an electronic message. If no alternative actions are activated via user input 947, as an example, then one or more user input 926b may cause electronic messages 937d, 937b, 937, and 937a to scroll off a visible area of user interface 901, whereby predicted default actions may be applied. Thus, electronic message 937d, if no user inputs 947 are detected, may be rejected automatically as a predicted default disposition, and based on a common user input or gesture.

Figure 10:
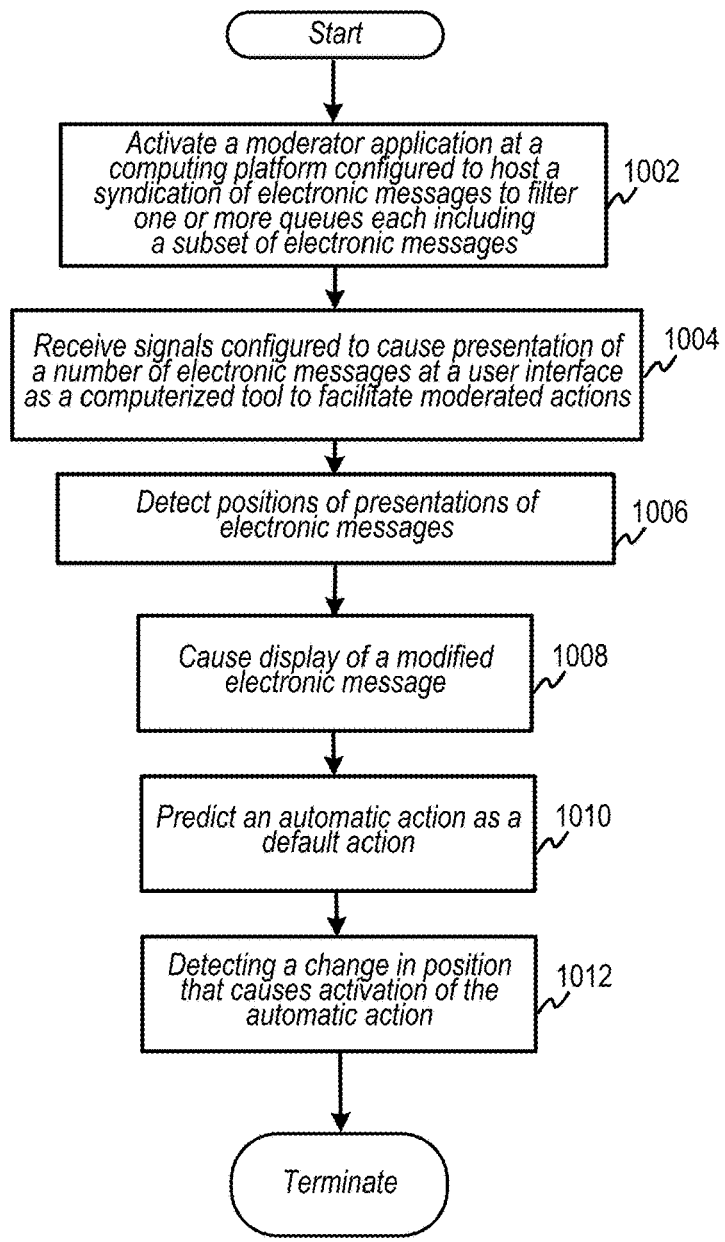
FIG. 10 is a flow diagram as another example of moderating a number of electronic message using either proposed modified message content or predicted automatic default actions, or both, according to some embodiments.

FIG. 10 is a flow diagram as another example of moderating a number of electronic message using either proposed modified message content or predicted automatic default actions, or both, according to some embodiments. Flow 1000 may begin at 1002, at which a moderator application may be activated to filter a number of queues each including a subset of electronic messages. A moderator application may be implemented in association with a computing platform, which may be configured to host a syndication of electronic messages (e.g., an online community). At 1004, signals configured to cause presentation of a number of electronic messages at a user interface may be received. In some examples, a moderator application implemented in electronic communication with a user interface may configure the user interface as a computerized tool to facilitate moderated actions. At 1006, positions at which to present electronic messages may be detected, whereby one or more positions may be indicative of one or more states that may activate one or more actions.

At 1008, a moderator application may be configured to cause display of a modified electronic message based on, for example, detection of non-compliant message components (e.g., profane text), or the like. At 1010, a predicted automatic action may be predicted so as to implement a default action automatically, whereby the predicted automatic action may be any default action, such as approval, rejection, or the like. At 1012, a detected change in position of an electronic message in a viewable area of a user interface may invoke or cause activation of an automatic action, such as a predicted automatic default action.

Figure 11:
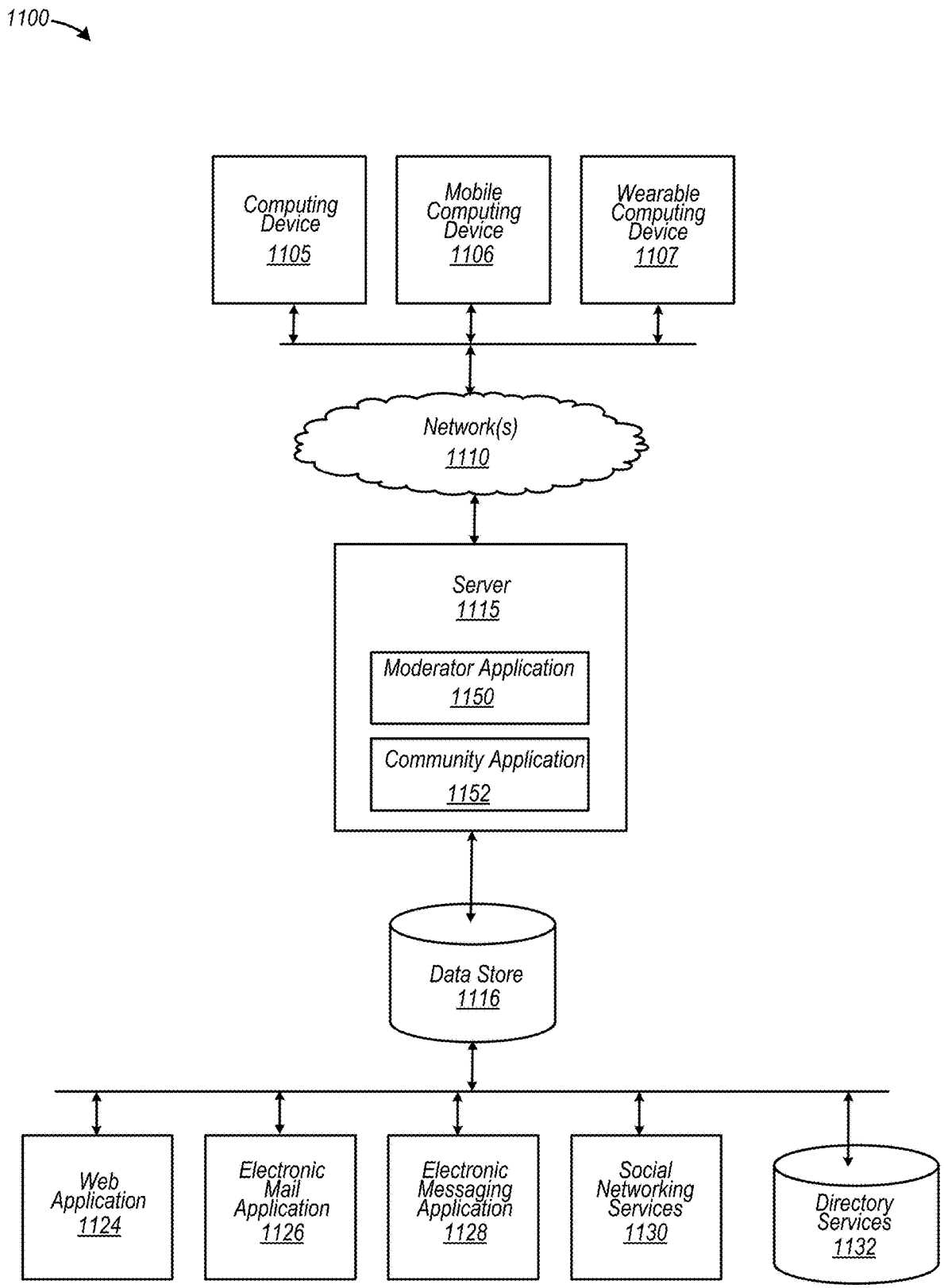
FIG. 11 depicts an example of a system architecture to provide a computing platform to host a syndication of electronic messages and posts for moderation, according to an example.

FIG. 11 depicts an example of a system architecture to provide a computing platform to host a syndication of electronic messages and posts for moderation, according to an example. Content, messages, and/or posts may be stored in (or exchanged with) various communication channels or storage devices as unmoderated or moderated content. For example, various units of content may be stored using one or more of a web application 1124, an email application service 1126, an electronic messaging application 1128 (e.g., a texting or messenger application), social networking services 1130 and a directory services repository 1132 (e.g., an AWS® directory service provided by Amazon Web Services, Inc., or any other directory service). A server 1115 may implement a moderator application 1150 for use by moderator-users and a community application 1152 for use by client applications and devices. As an example, server 1115 may be a web server providing the applications 1150 and 1152 via networks 1110. As an example, a client computing device may be implemented and/or embodied in a computer device 1105, a mobile computing device 1106 (e.g., a smart phone), a wearable computing device 1107, or other computing device. Any of these client computing devices 1105 to 1107 may be configured to transmit content (e.g., as electronic posts) from the store 1116, and may be configured to receive content (e.g., other electronic posts constituting an online community).

Figure 12:
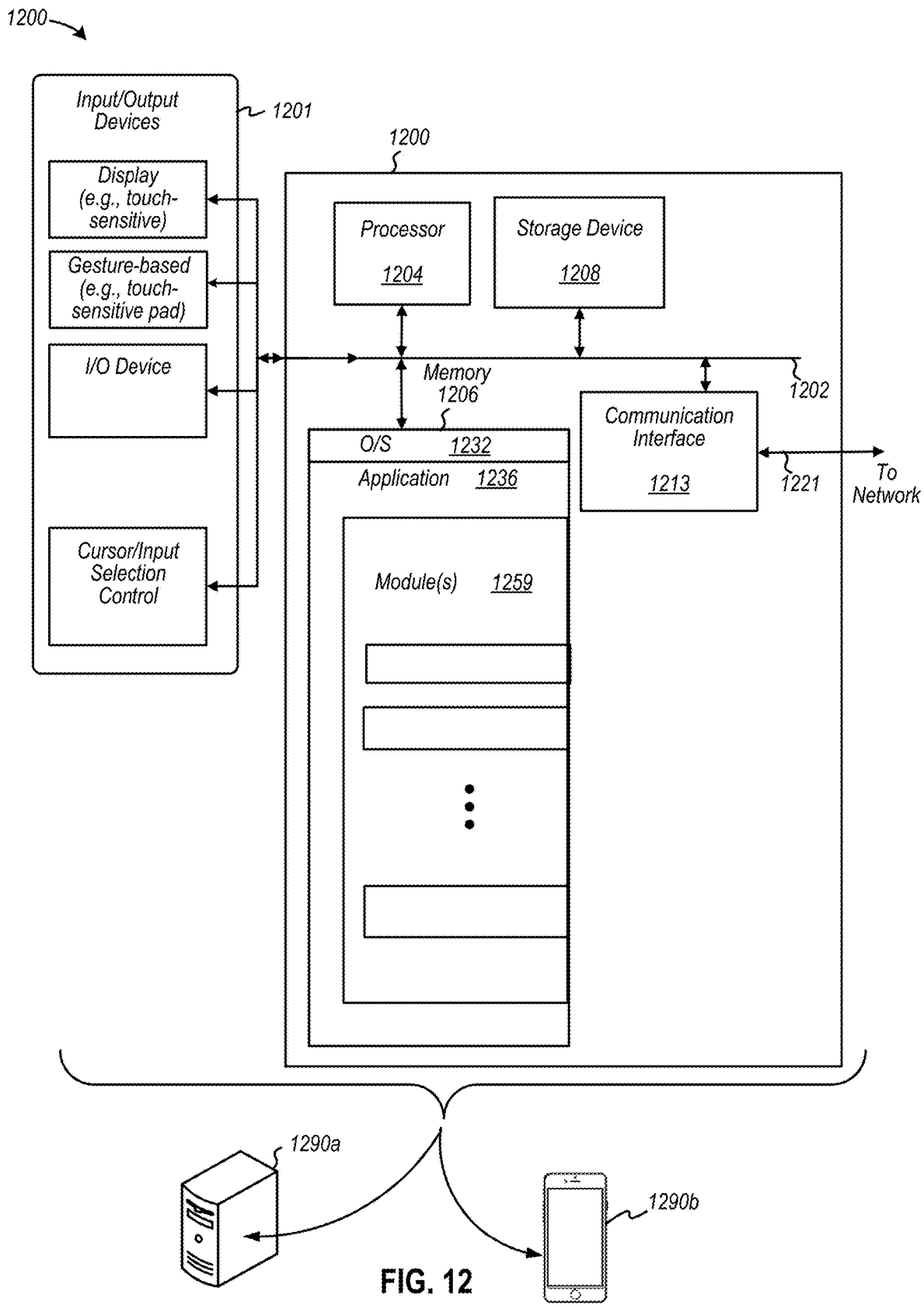
FIG. 12 is a diagram depicting an example of an electronic message response platform configured to moderate content and/or electronic messages, according to some examples.

FIG. 12 illustrates examples of various computing platforms configured to provide various functionalities to components of an electronic message platform 1200 to moderate electronic messages. Computing platform 1200 may be used to implement computer programs, applications, methods, processes, algorithms, or other software, as well as any hardware implementation thereof, to perform the above-described techniques.

In some cases, computing platform 1200 or any portion (e.g., any structural or functional portion) can be disposed in any device, such as a computing device 1290a, mobile computing device 1290b, and/or a processing circuit in association with initiating any of the functionalities described herein, via user interfaces and user interface elements, according to various examples.

Computing platform 1200 includes a bus 1202 or other communication mechanism for communicating information, which interconnects subsystems and devices, such as processor 1204, system memory 1206 (e.g., RAM, etc.), storage device 1208 (e.g., ROM, etc.), an in-memory cache (which may be implemented in RAM 1206 or other portions of computing platform 1200), a communication interface 1213 (e.g., an Ethernet or wireless controller, a Bluetooth controller, NFC logic, etc.) to facilitate communications via a port on communication link 1221 to communicate, for example, with a computing device, including mobile computing and/or communication devices with processors, including database devices (e.g., storage devices configured to store atomized datasets, including, but not limited to triplestores, etc.). Processor 1204 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1200 exchanges data representing inputs and outputs via input-and-output devices 1201, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1201 may be implemented as, or otherwise substituted with, a user interface in a computing device associated with, for example, a user account identifier in accordance with the various examples described herein.

According to some examples, computing platform 1200 performs specific operations by processor 1204 executing one or more sequences of one or more instructions stored in system memory 1206, and computing platform 1200 can be implemented in a client-server arrangement, peer-to-peer arrangement, or as any mobile computing device, including smart phones and the like. Such instructions or data may be read into system memory 1206 from another computer readable medium, such as storage device 1208. In some examples, hard-wired circuitry may be used in place of or in combination with software instructions for implementation. Instructions may be embedded in software or firmware. The term "computer readable medium" refers to any tangible medium that participates in providing instructions to processor 1204 for execution. Such a medium may take many forms, including but not limited to, non-volatile media and volatile media. Non-volatile media includes, for example, optical or magnetic disks and the like. Volatile media includes dynamic memory, such as system memory 1206.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1202 for transmitting a computer data signal.

In some examples, execution of the sequences of instructions may be performed by computing platform 1200. According to some examples, computing platform 1200 can be coupled by communication link 1221 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1200 may transmit and receive messages, data, and instructions, including program code (e.g., application code) through communication link 1221 and communication interface 1213. Received program code may be executed by processor 1204 as it is received, and/or stored in memory 1206 or other non-volatile storage for later execution.

In the example shown, system memory 1206 can include various modules that include executable instructions to implement functionalities described herein. System memory 1206 may include an operating system ("O/S") 1232, as well as an application 1236 and/or logic module(s) 1259. In the example shown in FIG. 12, system memory 1206 may include any number of modules 1259, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1259 of FIG. 12, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1259 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1259 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1259 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method, comprising:
   activating a moderator application at a computing platform configured to host a syndication of electronic messages, the moderator application being configured to filter a plurality of queues, each of the plurality of queues having a subset of the electronic messages;
   receiving a signal configured to cause presentation of an electronic message at an interface, the interface being in data communication with the moderator application and being configured to be modified by the moderator application;
   detecting an input associated with a position of each of the electronic messages on the interface, the position being configured to indicate a state that, when the each of the electronic messages is displayed at the position on the interface, activates an automatic action by the moderator application;
   determining if a non-compliant message component is included in the each of the electronic messages;
   modifying the each of the electronic messages if the non-compliant message component is detected to generate a modified electronic message;
   invoking a predicted automatic action based on the modified electronic message; and
   displaying the modified electronic message in another position of the interface, the another position comprising a detected change in the position of at least one of the each of the electronic messages on the interface at which to display the modified electronic message, and the another position activating another automatic action by the moderator application.

2. The method of claim 1, wherein the activating the moderator application at the computing platform comprises invoking a community syndication controller.

3. The method of claim 1, wherein the activating the moderator application at the computing platform comprises invoking a message management controller.

4. The method of claim 1, wherein the activating the moderator application at the computing platform comprises invoking a message moderation engine.

5. The method of claim 1, wherein the syndication of the electronic messages comprises an online community.

6. The method of claim 1, wherein the syndication of the electronic messages comprises an online community and each of the electronic messages is associated with an account associated with the online community.

7. The method of claim 1, wherein each of the plurality of queues is managed by a queue manager in data communication with a message moderation engine invoked by the moderator application.

8. The method of claim 1, wherein each of the plurality of queues is managed by a queue manager in data communication with a message moderation engine invoked by the moderator application, the queue manager being configured to arrange the electronic messages by analyzing a message attribute associated with each of the electronic messages.

9. The method of claim 1, wherein the input comprises gesture-based user input detected on the interface.

10. A system, comprising:
    a repository configured to store data associated with an electronic message; and
    a processor configured to activate a moderator application at a computing platform configured to host a syndication of electronic messages, the moderator application being configured to filter a plurality of queues, each of the plurality of queues having a subset of the electronic messages, to receive a signal configured to cause presentation of the electronic message at an interface, the interface being in data communication with the moderator application and being configured to be modified by the moderator application, to detect an input associated with a position of each of the electronic messages on the interface, the position being configured to indicate a state that, when the each of the electronic messages is displayed at the position on the interface, activates an automatic action by the moderator application, to determine if a non-compliant message component is included in the each of the electronic messages, to modify the each of the electronic messages if the non-compliant message component is detected to generate a modified electronic message, to invoke a predicted automatic action based on the modified electronic message, and to display the modified electronic message in another position of the interface, the another position comprising a detected change in the position of at least one of the each of the electronic messages on the interface at which to display the modified electronic message, and the another position activating another automatic action by the moderator application.

11. The system of claim 10, wherein the signal comprises gesture-based user input data.

12. The system of claim 10, wherein the moderator application further comprises a moderation processor configured to determine the state.

13. The system of claim 10, wherein the moderator application further comprises a moderation processor configured to parse gesture-based user input data to determine the state to assign to the electronic message.

14. The system of claim 10, wherein the moderator application further comprises a gesture detector configured to receive the signal, the signal being used to identify a region on the interface to display the modified electronic message.

15. The system of claim 10, wherein the moderator application further comprises a gesture detector configured to receive the signal, the signal being used to identify a position on the interface to display the modified electronic message.

16. The system of claim 10, wherein the moderator application further comprises a gesture detector configured to parse the signal to identify gesture-based user input data.

17. The system of claim 10, wherein the moderator application is in data communication with an action selector configured to analyze the signal to identify gesture-based user input data to further identify data indicating a correction between a detected set of gesture-based user input data values and one or more automatic actions.

18. The system of claim 10, wherein the moderator application is in data communication with an action selector configured to analyze the signal to identify gesture-based user input data to further identify data indicating a correction between a detected gesture-based user input data value and the automatic action if the detected gesture-based user input data value is within a range.

19. The system of claim 10, wherein the processor is further configured to evaluate the signal to identify a subset of values that correlate to a range of pixels associated with the interface, the range being further associated with one or more automatic actions when the modified electronic message is displayed on the interface at the range.

20. A non-transitory computer readable medium having one or more computer program instructions configured to perform a method, the method comprising:
activating a moderator application at a computing platform configured to host a syndication of electronic messages, the moderator application being configured to filter a plurality of queues, each of the plurality of queues having a subset of the electronic messages;
receiving a signal configured to cause presentation of an electronic message at an interface, the interface being in data communication with the moderator application and being configured to be modified by the moderator application;
detecting an input associated with a position of each of the electronic messages on the interface, the position being configured to indicate a state that, when the each of the electronic messages is displayed at the position on the interface, activates an automatic action by the moderator application;
determining if a non-compliant message component is included in the each of the electronic messages;
modifying the each of the electronic messages if the non-compliant message component is detected to generate a modified electronic message;
invoking a predicted automatic action based on the modified electronic message; and
displaying the modified electronic message in another position of the interface, the another position comprising a detected change in the position of at least one of the each of the electronic messages on the interface at which to display the modified electronic message, and the another position activating another automatic action by the moderator application.

* * * * *